US007120803B2

(12) United States Patent
Tanaka

(10) Patent No.: US 7,120,803 B2
(45) Date of Patent: Oct. 10, 2006

(54) PORTABLE APPLIANCE FOR REPRODUCING A MUSICAL COMPOSITION, POWER SAVING METHOD, AND STORAGE MEDIUM THEREFOR

(75) Inventor: Takahiro Tanaka, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 429 days.

(21) Appl. No.: 10/239,812

(22) PCT Filed: Apr. 3, 2001

(86) PCT No.: PCT/JP01/02902

§ 371 (c)(1),
(2), (4) Date: Feb. 19, 2003

(87) PCT Pub. No.: WO01/75858

PCT Pub. Date: Oct. 11, 2001

(65) Prior Publication Data

US 2003/0160702 A1 Aug. 28, 2003

(51) Int. Cl.

*G06F 1/28* (2006.01)
*G06F 1/26* (2006.01)
*G06F 1/32* (2006.01)
*G10H 1/00* (2006.01)

(52) U.S. Cl. ...................... 713/300; 713/320; 713/324; 84/600

(58) Field of Classification Search ................ 713/300, 713/320, 324; 84/600

See application file for complete search history.

(56) References Cited

U.S. PATENT DOCUMENTS 5,728,961 A * 3/1998 Tamura ....................... 84/600
6,025,552 A * 2/2000 Mukaino et al. .............. 84/605
6,583,347 B1 * 6/2003 Tamura ....................... 84/603

FOREIGN PATENT DOCUMENTS

EP 0463411 A2 1/1992
JP H04-058291 2/1992

(Continued)

OTHER PUBLICATIONS

Official Action for the Korean Patent Application, dated Feb. 18, 2005.

(Continued)

*Primary Examiner*—Chun Cao
*Assistant Examiner*—Ji H. Bae
(74) *Attorney, Agent, or Firm*—Pillsbury Winthrop Shaw Pittman LLP

(57) ABSTRACT

There are provided a mobile device that is equipped with a musical composition-reproducing section and capable of curtailing the battery drain as much as possible, and a mobile device that prevents the quality of reproduced musical tones from being degraded even if the voltage level of the battery lowers. A battery voltage detector monitors an voltage level of a battery. The musical composition-reproducing section is controlled such that the number of parts of the musical composition reproduced by the musical composition-reproducing section is reduced when the monitored voltage level of the battery becomes lower than a reference value. In other forms of the invention, when the monitored voltage level of the battery becomes lower than a reference value, a first predetermined number of parts of the musical composition data are assigned to intrinsic ones of a larger second predetermined number of parts that correspond to the first predetermined number of parts of said musical composition, as well as to other ones of the second predetermined number of parts than the intrinsic ones, for reproduction of the musical composition, or the gain of a variable-gain amplifier is increased to compensate for the lowering of the volume of the reproduced parts.

20 Claims, 12 Drawing Sheets

FOREIGN PATENT DOCUMENTS

| | | |
|---|---|---|
| JP | H04-060698 | 2/1992 |
| JP | H4-236544 | 8/1992 |
| JP | H10-39272 | 2/1993 |
| JP | H06-167969 | 6/1994 |
| JP | H07-271358 | 10/1995 |
| JP | H11-088478 | 3/1999 |
| KR | 1999-73832 | 10/1999 |

OTHER PUBLICATIONS

Decision of Rejection for the Korean Patent Application, dated Jun. 28, 2005.

Official Office Action for Japanese Patent Application No. 2000-100503, dated Aug. 24, 2005 (corresponding to present application).

* cited by examiner

PORTABLE APPLIANCE FOR REPRODUCING A MUSICAL COMPOSITION, POWER SAVING METHOD, AND STORAGE MEDIUM THEREFOR

This application is the National Phase of International Application PCT/JP01/02902 filed 03 Apr. 2001 which designated the U.S. and that International Application was not published under PCT Article 21(2) in English.

TECHNICAL FIELD

This invention relates to a mobile device having musical composition-reproducing means, a power saving method for saving power thereof and a volume compensating method for compensating for lowering of the volume of musical tones reproduced thereby, storage media storing respective programs for executing these methods, and more particularly to those which can be suitably applied to a car telephone, a cellular phone, and the like.

BACKGROUD ART

In a cellular phone system, such as a PDC (Personal Digital Cellular telecommunication system), known as an analog cellular system or a digital cellular system, and a PHS (Personal Handyphone System), when a cellular phone or mobile phone device carried by a user receives an incoming call, an alert sound is generated to notify the user of the incoming call. As the alert sound, a beep has been conventionally used, but recently, a music including a melody has come to be used in place of the beep since the beep is offensive to the ear.

A conventional mobile phone device that is capable of reproducing music is equipped with musical composition-reproducing means that is capable of playing automatic performance. The musical composition-reproducing means generally includes a CPU (Central Processing Unit), a ROM (Read Only Memory), a RAM (Random Access Memory), and a tone generator. The CPU executes an automatic performance program read from the ROM, thereby reading data of a musical composition from the ROM or the RAM, and setting tone generation parameters to the tone generator to reproduce the musical composition.

To reproduce high-quality musical tones, some of the recent mobile phone devices are equipped with musical composition-producing means capable of reproducing a musical composition composed of a plurality of parts.

A mobile phone device is required to be small-sized and lightweight such that it can be conveniently carried by the user, and therefore the space occupied by a battery as a power source of the mobile phone device cannot be increased.

However, when the musical composition-reproducing means performs reproduction of a plurality of parts, high-speed processing is carried out, so that much power is consumed to shorten the battery life.

Further, if the voltage level of the battery is low when the musical composition-reproducing means reproduces a musical composition composed of a plurality of parts, the volume level of the reproduced musical tones lowers to degrade the quality of the reproduced musical tones.

Therefore, it is an object of the present invention to provide a mobile device that is equipped with musical composition-reproducing means and capable of curtailing the battery drain as much as possible, a power saving method therefor, and a storage medium storing a program for executing the method.

Further, it is another object of the present invention to provide a mobile device that prevents the quality of reproduced musical tones from being degraded even if the voltage level of the battery lowers, a volume compensating method therefor, and a storage medium storing a program for executing the method.

DISCLOSURE OF INVENTION

To attain the first-mentioned object, according to a first aspect of the present invention, there is provided a mobile device comprising musical composition-reproducing means that is capable of reproducing a musical composition composed of a plurality of parts, power supply means that supplies power to the musical composition-reproducing means, charge state-monitoring means that monitors an amount of charge in the power supply means, and control means that provides control such that the number of parts of the musical composition reproduced by the musical composition-reproducing means is reduced when the monitored amount of charge in the power supply means becomes lower than a predetermined value.

According to this mobile device, when the monitored amount of charge in the power supply means becomes lower than a predetermined value, the control means causes the number of parts reproduced by the musical composition-reproducing means to be reduced. Therefore, it is possible to curtail the battery drain as much as possible. Further, when the amount of charge in the battery is large, all the parts of the musical composition are reproduced, and hence high-quality musical tones can be reproduced.

It is preferred the musical composition-reproducing means includes a plurality of musical tone synthesis sections for reproducing the musical composition composed of the plurality of parts, and wherein the control means provides control such that the number of the plurality of musical tone synthesis sections to which data of the musical composition is supplied is reduced when the monitored amount of charge in the power supply means becomes lower than the predetermined value.

It is more preferred that the musical composition-reproducing means includes a temporary storage section that temporarily stores the data of the musical composition, a plurality of switching devices arranged between the temporary storage section and the plurality of musical tone synthesis sections, for connecting and disconnecting between the temporary storage section and the plurality of musical tone synthesis sections, respectively, and when the monitored amount of charge in the power supply means becomes lower than the predetermined value, the control means reduces the number of the plurality of switching devices that connect between the temporary storage section and the plurality of musical tone synthesis sections to thereby reduce the number of the plurality of musical tone synthesis sections to which the data of the musical composition is supplied.

It is more preferred that the mobile device includes storage means that stores the data of the musical composition, the musical composition-reproducing means including a temporary storage section that temporarily stores the data of the musical composition, and reading/writing control means that controls reading and writing the data of the musical composition from and into the temporary storage section, and when the monitored amount of charge in the power supply means becomes lower than the predetermined value, the control means causes the reading/writing control means such that the number of parts of the data of the musical composition written into the temporary storage sections is reduced.

Alternatively, it is more preferred that the data of the musical composition contains a mixture of data of the plurality of parts, the musical composition-reproducing means including a temporary storage section that temporarily stores the data of the musical composition, and sequencer means that sequentially reads out the data of the musical composition stored in the temporary storage section into the plurality of musical tone synthesis sections, and when the monitored amount of charge in the power supply means becomes lower than the predetermined value, the control means controls the sequencer means such that the number of parts of the data of the musical composition read out from the temporary storage section into the plurality of musical tone synthesis sections is reduced.

Alternatively, it is more preferred that the musical composition-reproducing means includes a single musical tone synthesis section that is capable of reproducing the musical composition composed of the plurality of parts by time-sharing operation, a temporary storage section that temporarily stores the data of the musical composition, a single switching device arranged between the temporary storage section and the musical tone synthesis section, for connecting and disconnecting between the temporary storage section and the musical tone synthesis section, and when the monitored amount of charge in the power supply means becomes lower than the predetermined value, the control means controls timing of operation of the switching device such that the number of the plurality of musical tone synthesis sections to which the data of the musical composition is supplied is reduced.

Alternatively, it is preferred that the mobile device includes storage means that stores the data of the musical composition, and wherein when the monitored amount of charge in the power supply means becomes lower than the predetermined value, the control means provides control such that a number of parts of the musical composition supplied to the musical composition-reproducing means is reduced.

Alternatively, it is preferred that the musical composition-reproducing means includes a plurality of musical tone synthesis sections for reproducing the musical composition composed of the plurality of parts, and the control means provides control such that the number of the plurality of musical tone synthesis sections to which the power is supplied from the power supply means is reduced when the monitored amount of charge in the power supply means becomes lower than the predetermined value.

Alternatively, it is preferred that when the monitored amount of charge in the power supply means becomes lower than the predetermined value, the control means provides control such that only a melody part is reproduced by the musical composition-reproducing means.

It is preferred that the musical composition-reproducing means includes a plurality of musical tone synthesis sections for reproducing the musical composition composed of the plurality of parts, and the control means provides control such that the data of the musical composition is supplied only to one of the plurality of musical tone synthesis sections that reproduces a melody part.

Alternatively, it is preferred that the musical composition-reproducing means includes a plurality of musical tone synthesis sections for reproducing the musical composition composed of the plurality of parts, and wherein the control means provides control such that power is supplied from the power supply means only to one of the plurality of musical tone synthesis sections that reproduces a melody part.

According to this preferred embodiment, when the monitored amount of charge in the power supply means becomes lower than a predetermined value, the control means causes only a melody part to be reproduced by the musical composition-reproducing means. Therefore, it is possible to curtail the battery drain as much as possible, and at the same time reduce adverse influence of the power saving operation which causes the lowering of the quality of the reproduced musical tones.

To attain the second-mentioned object, according to a second aspect of the invention, there is provided a mobile device comprising musical composition-reproducing means that reproduces a musical composition from musical composition data composed of a first predetermined number of parts, the musical composition-reproducing means being capable of reproducing a second predetermined number of parts, the second predetermined number being larger than the first predetermined number, power supply means that supplies power to the musical composition-reproducing means, voltage level-monitoring means that monitors a voltage level of the power supply means, and volume compensating means that carries out a volume compensation process by assigning the first predetermined number of parts of the musical composition data to intrinsic ones of the second predetermined number of parts that correspond to the first predetermined number of parts of the musical composition, as well as to other ones of the second predetermined number of parts than the intrinsic ones, for reproduction of the musical composition by the musical composition-reproducing means, when the monitored voltage level of the power supply means becomes lower than a predetermined value.

According to this mobile device, when the voltage level of the power supply means becomes lower than a predetermined value, the volume compensation process is carried out such that a first predetermined number of parts of the musical composition data are assigned to intrinsic ones of a larger second predetermined number of parts that correspond to the first predetermined number of parts of the musical composition, as well as to other ones of the second predetermined number of parts than the intrinsic ones This causes each part to be reproduced by a plurality of parts by the musical composition-reproducing means when the voltage level of the battery lowers, and by superposing these parts upon each other, it is possible to compensate for the lowered volume level of each part of the musical composition. Therefore, it is possible to prevent degradation of the quality of the reproduced musical tones.

It is preferred that the musical composition-reproducing means includes a plurality of musical tone synthesis sections, and assigning means that assigns each of the parts of the musical composition data to a selected one of the musical tone synthesis sections, and the volume compensating means assigns the parts of the musical composition data to ones of the musical tone synthesis sections having been unassigned to any parts in addition to other ones of the musical tone synthesis sections intrinsically assigned to the parts of the musical composition data.

It is preferred that when the monitored voltage level of the power supply means becomes lower than a predetermined value, the volume compensating means obtains musical composition data which is doubled in number of parts by duplicating the musical composition data composed of the first predetermined number of parts, and supplies the musical composition data which is doubled in number of parts to the musical composition-reproducing means.

It is preferred that the mobile device includes mode-setting means that is capable of setting a high-quality mode in which the musical composition-reproducing means reproduces musical tones of high quality, and a normal quality mode in which the musical composition-reproducing means reproduces musical tones of normal quality, and the volume compensating means carries out the volume compensating process only when the high-quality mode is set by the mode-setting means.

It is preferred that when the monitored voltage level of the power supply means becomes lower than the predetermined value, the volume compensating means obtains, by duplicating at least a melody part of the musical composition data composed of the first predetermined number of parts, musical composition data which is doubled at least in number of identical parts for the melody part, and supplies the obtained musical composition data to the musical composition-reproducing means.

To attain the second-mentioned object, according to a third aspect of the invention, there is provided a mobile device comprising musical composition-reproducing means that is capable of reproducing a musical composition composed of a plurality of parts, the musical composition-reproducing means having volume control means for controlling a volume level of the reproduced plurality of parts, power supply means that supplies power to the musical composition-reproducing means, voltage level-monitoring means that monitors a voltage level of the power supply means, and volume compensation control means that controls the volume control means so as to carry out a volume compensating process, when the monitored voltage level of the power supply means becomes lower than a predetermined value.

According to this mobile device, since the device includes volume control means for controlling a volume level of the reproduced plurality of parts, when the monitored voltage level becomes lower than a predetermined value, it is possible for the volume compensation control means to control the volume control means such that the volume compensation process is carried out. This makes it possible to compensate for the lowered volume level of the reproduced musical tones, and hence it is possible to prevent degradation of the quality of the reproduced musical tones.

It is preferred that the mobile device further includes mode-setting means that is capable of setting a high-quality mode in which the musical composition-reproducing means reproduces musical tones of high quality, and a normal quality mode in which the musical composition-reproducing means reproduces musical tones of normal quality, and wherein the volume compensation control means controls the volume control means so as to carry out the volume compensating process only when the high-quality mode is set by the mode-setting means.

It is preferred that the volume control means includes a variable-gain amplifier.

To attain the first-mentioned object, according to a fourth aspect of the invention, there is provided a power saving method for a mobile device having musical composition-reproducing means that is capable of reproducing a musical composition composed of a plurality of parts, and power supply means that supplies power to the musical composition-reproducing means, the power saving method saving power consumed from the power supply means, and comprising the steps of monitoring an amount of charge in the power supply means, and controlling the musical composition-reproducing means in a manner such that the number of parts of the musical composition reproduced by the musical composition-reproducing means is reduced when the monitored amount of charge in the power supply means becomes lower than a predetermined value.

To attain the second-mentioned object, according to a fifth aspect of the invention, there is provided a volume compensating method for a mobile device having musical composition-reproducing means that reproduces a musical composition composed of a first predetermined number of parts, the musical composition-reproducing means being capable of reproducing a second predetermined number of parts, the second predetermined number being larger than the first predetermined number, and power supply means that supplies power to the musical composition-reproducing means, the volume compensating method compensating for lowering of a volume of musical tones reproduced by the mobile device, the method comprising the steps of monitoring a voltage level of the power supply means, and carrying out a volume compensation process by assigning the first predetermined number of parts of the musical composition data to intrinsic ones of the second predetermined number of parts that correspond to the first predetermined number of parts of the musical composition, as well as to other ones of the second predetermined number of parts than the intrinsic ones, for reproduction of the musical composition by the musical composition-reproducing means, when the monitored voltage level of the power supply means becomes lower than a predetermined value.

To attain the second-mentioned object, according to a sixth aspect of the invention, there is provided a volume compensating method for a mobile device having musical composition-reproducing means that is capable of reproducing a musical composition composed of a plurality of parts, the musical composition-reproducing means having volume control means for controlling a volume level of the reproduced plurality of parts, and power supply means that supplies power to the musical composition-reproducing means, the volume compensating method compensating for lowering of a volume of musical tones reproduced by the mobile device, the method comprising the steps of monitoring a voltage level of the power supply means, and controlling the volume control means so as to carry out a volume compensating process when the monitored voltage level of the power supply means becomes lower than a predetermined value.

To attain the first-mentioned object, according to a seventh aspect of the invention, there is provided a storage medium storing a program that can be executed by a computer, the program being capable of realizing the power saving method described above, and to attain the second-mentioned object, according to eighth and ninth aspects of the invention, there are provided storage media storing programs that can be executed by a computer, the programs being capable of realizing the respective volume compensating methods described above.

BEST MODE OF CARRYING OUT THE INVENTION

The present invention will now be described in detail with reference to the drawings, showing embodiments thereof.

Figure 1:
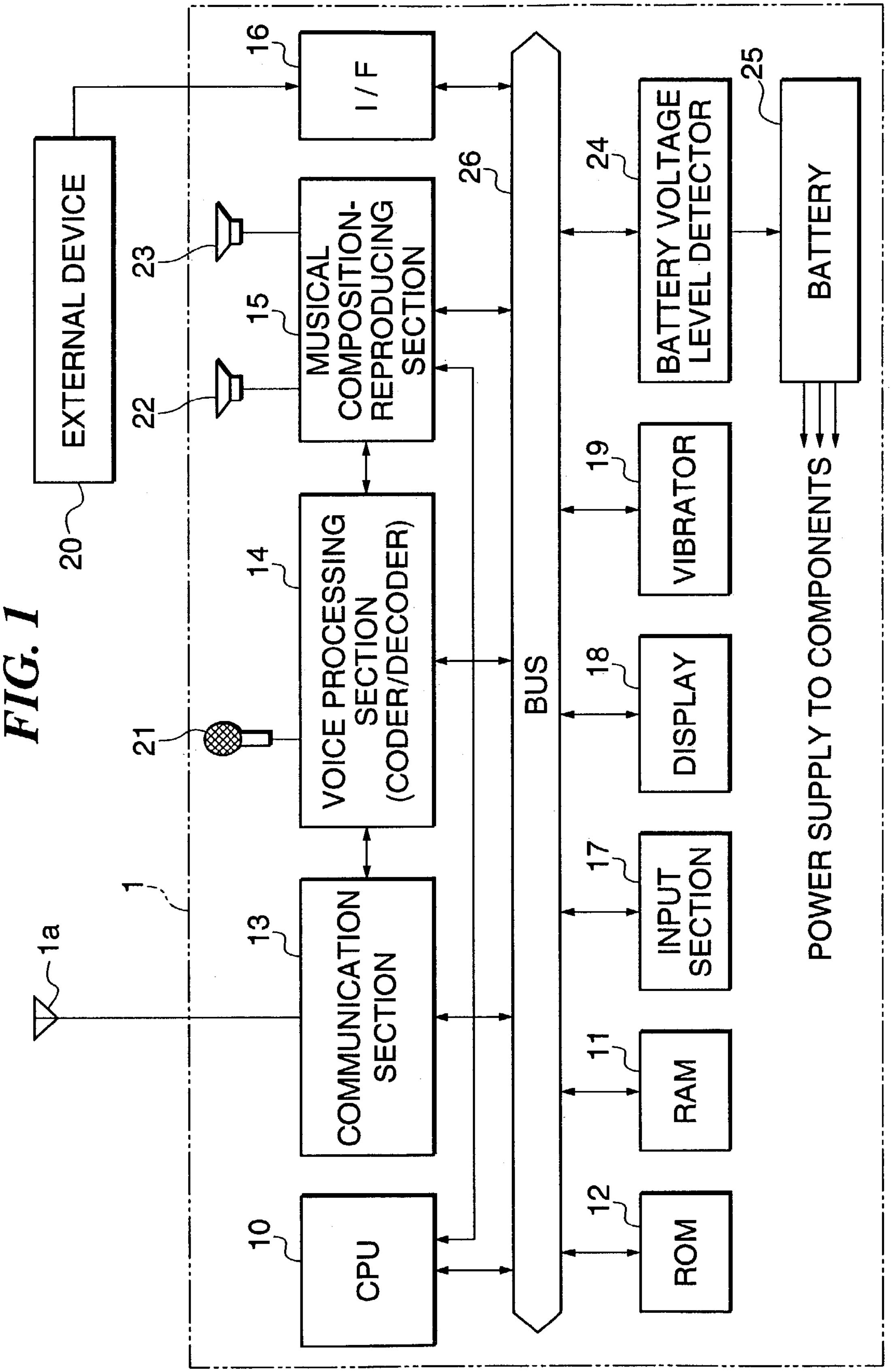
FIG. 1 is a block diagram showing the whole arrangement of a cellular phone to which a mobile device according to a first embodiment of the present invention is applied.

FIG. 1 shows the whole arrangement of a cellular phone to which is applied a mobile device according to a first embodiment of the present invention. The cellular phone shown in FIG. 1 includes an antenna 1*a*, which is usually configured to be retractable, and connected to a communication section 13 having a modulating/demodulating function. A system CPU (Central Processing Unit) 10 controls the operations of component parts of the cellular phone 1 by executing telephone function programs, and includes a timer for indicating a time period elapsed during operation thereof and generating a timer interrupt at predetermined time intervals. Further, the system CPU 10 carries out a power saving process and a process for aiding a musical composition-reproducing process in response to an intervention required (IRQ) signal. A system RAM (Random Access Memory) 11 is allocated to a musical composition data storage area for storing data of musical compositions each composed of a plurality of parts and downloaded from a download center or the like, user configuration data storage area for storing data of a configuration by the user, a work area for operation of the system CPU 10, and the like. A system ROM (Read Only Memory) 12 stores various telephone function programs for transmitting and receiving messages, and other programs for the process for aiding the musical composition-reproducing process, and others, and various data including data of preset musical compositions.

Further, a communication section 13 carries out demodulation of a signal received by the antenna 1*a*, and modulation of a signal to be transmitted via the antenna 1*a* to supply the modulated signal to the antenna. A received message signal demodulated by the communication section 13 is compression-decoded by a voice processing section (coder/decoder) 14, while a sending message signal input via a microphone 21 is compression-encoded by the same. The voice processing section 14 carries out compression-encode/decode of speech with high efficiency, and is implemented by a coder/decoder based on a CELP (Code Excited LPC) method or an ADPCM (Adaptive Differential Pulse Code Modulation) method. A musical composition-reproducing section 15 reproduces voice messages based on the received message signal from the voice processing section 14 and causes the reproduced voice messages to be sounded via a received message speaker 22, or reproduces a incoming call sound (music-on-incoming call), a hold sound (music-on-hold), a BGM (background music), or a listening music, based on data of a musical composition (musical composition data). The music-on-incoming call and the listening music are sounded via an incoming call speaker 23, while the music-on-hold and the BGM are mixed with a received message signal and sounded via the received message speaker 22.

The musical composition data is comprised of a plurality of parts, and includes tone color parameters and sequence data for each part. When a predetermined amount of a free area occurs during reproduction of a musical composition by the musical composition-reproducing section 15, this section 15 sends an intervention required (IRQ) signal to the system CPU 10. In response to the IRQ signal, the system CPU 10 reads out a continued portion of the sequence data stored in the system RAM 11 or the system ROM 12 and forwards the same to the musical composition-reproducing section 15. An interface (I/F) 16 provides interface for use in downloading data of a musical composition composed of a plurality of parts, from an external device 20, such as a personal computer. An input section 17 is comprised of dial buttons for inputting “0” to “9”, respectively, and other buttons and switches for inputting data and instructions, including a music reproduction button, a call hold button, a connection button and a power save switch.

Further, a display 18 displays a menu of options for selecting telephone functions, and images associated with operations of respective buttons, including the dial buttons. A vibrator 19 vibrates the body of the cellular phone 1 upon receipt of an incoming call to thereby notify the user of the incoming call, provided that the cellular phone 1 is configured to use this function, instead of producing an alert sound. A battery 25 supplies power to the electrically-driven components of the cellular phone 1, and is implemented by a rechargeable cell. A battery voltage level detector 14 constantly monitors the voltage level of the battery 15. When the monitored voltage level of the battery 15 becomes lower than a reference value, the battery voltage level detector 14 sends information indicative of this fact to the system CPU 10, and the system CPU 10 controls the musical composition-reproducing section 15 such that the number of parts reproduced thereby is reduced, to reduce consumption of power. For instance, by controlling the musical composition-reproducing section 15 such that only a melody part is reproduced, the service life of the batter 25 can be prolonged. These sections having the functions described above are connected to each other by a bus 26, for sending and receiving data and instructions to and from each other.

Figure 2:
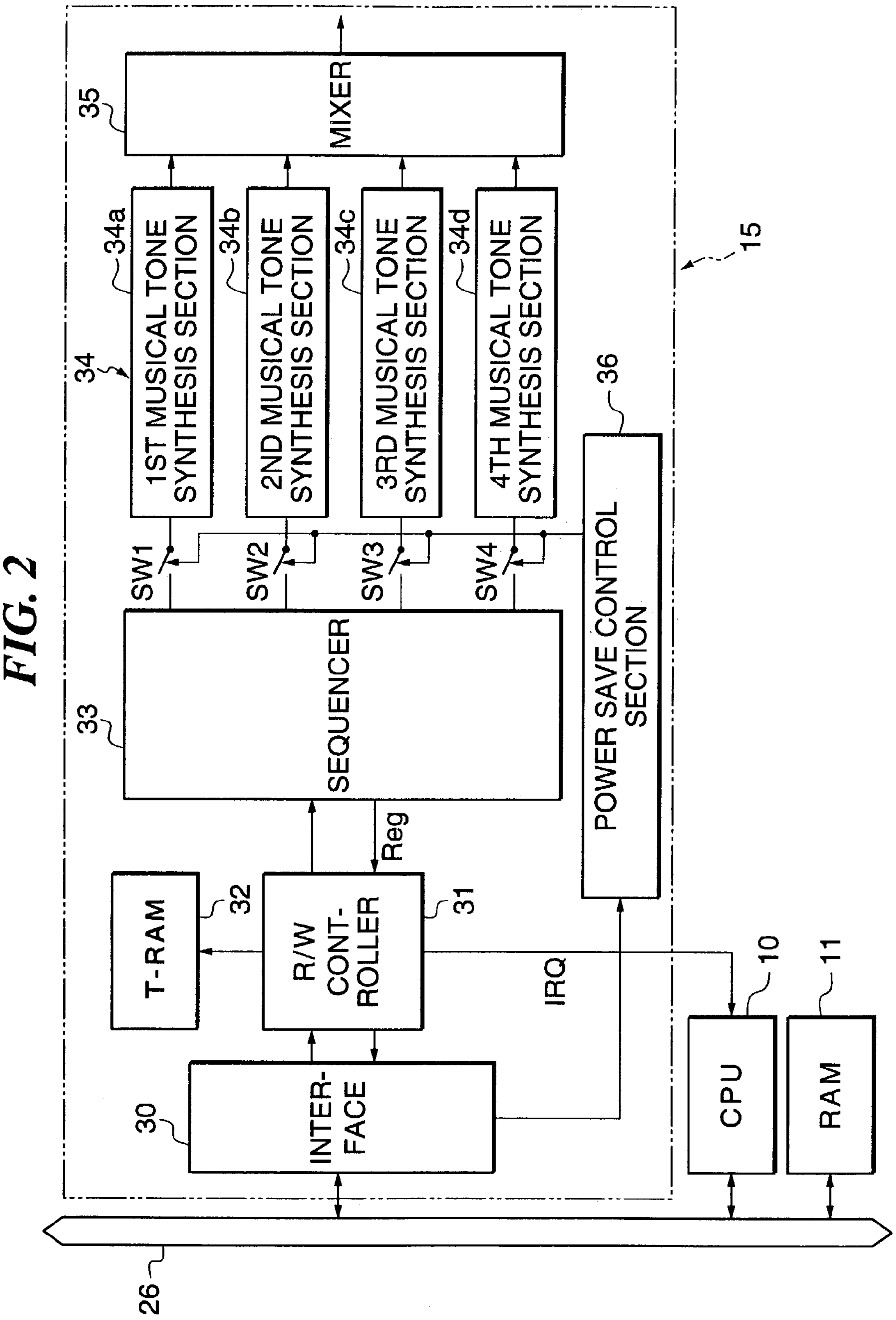
FIG. 2 is a block diagram showing a first configuration of a musical composition-reproducing section of the cellular phone according to the first embodiment.

FIG. 2 shows a first configuration of the musical composition-reproducing section 15 of the FIG. 1 cellular phone. Before describing this configuration, a first format and a second format of musical composition data based on which a musical composition is reproduced by the musical composition-reproducing section 15 will be described with reference to FIGS. 4(*a*) and 4(*b*).

Figure 4A:
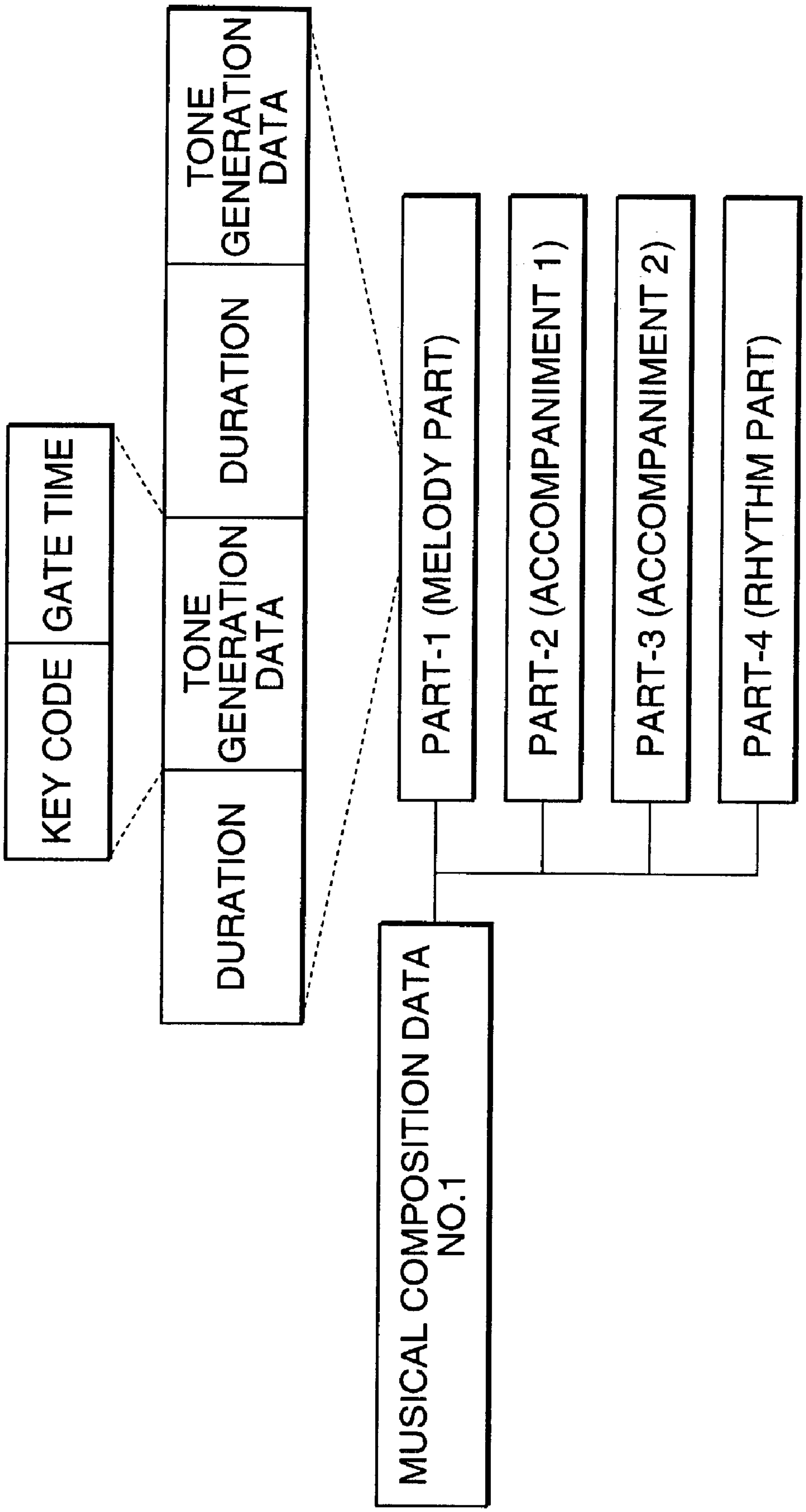
FIGS. 4(*a*) and 4(*b*) are diagrams showing respective first and second formats of musical composition data which can be used by the cellular phone according to the first embodiment.
Figure 4B:
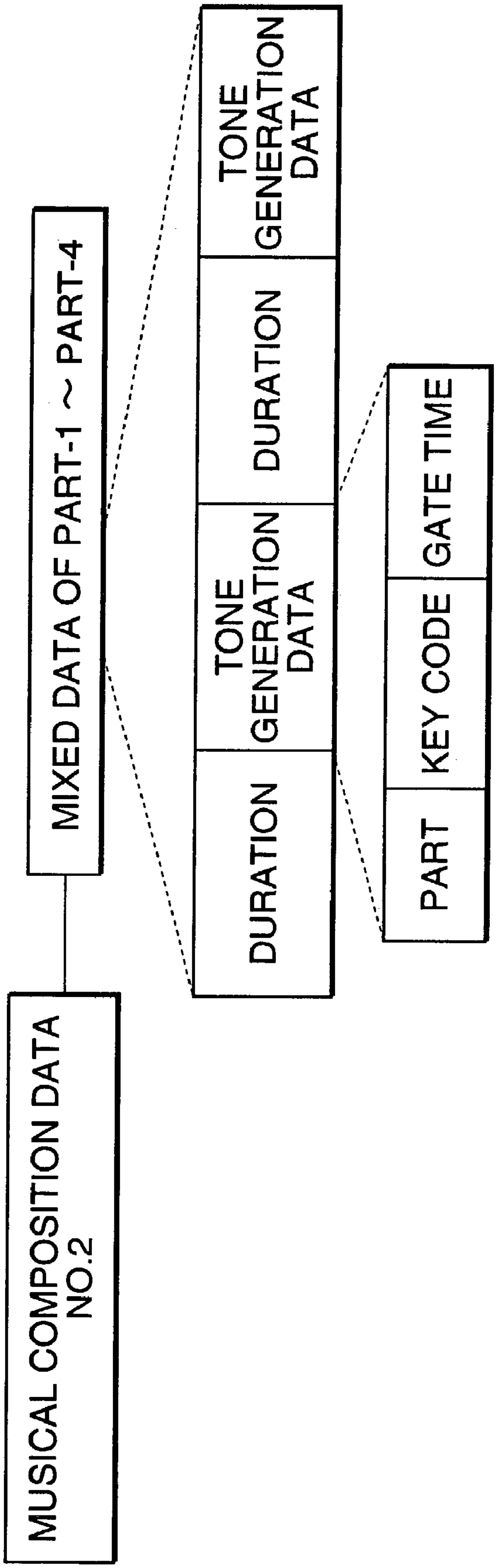

The illustrated example of musical composition data in the first format in FIG. 4(*a*) is assigned with a musical composition number 1 (musical composition data No. 1). The musical composition data No. 1 is comprised of four parts: part 1 (melody part), part 2 (accompaniment part 1), part 3 (accompaniment part 2), and part 4 (rhythm part). Each part is formed of tone color parameters and sequence data. The sequence data is formed by alternately arranging duration data indicative of a time interval between adjacent tone generation events, and tone generation data. Further, the tone generation data is formed of a key code indicative of tone pitch, and a gate time indicative of length of tone generation. The musical composition data in the first format is not necessarily required to have the above-mentioned four parts, but only required to have two or more parts.

The illustrated example of musical composition data in the second format shown in FIG. 4(*b*) is assigned with a musical composition number 2 (musical composition data No. 2). The musical composition data No. 2 is a mixture of four parts: part 1 (melody part), part 2 (accompaniment part 1), part 3 (accompaniment part 2), and part 4 (rhythm part), which are mixed together to form one sequence data. FIG. 4(*b*) shows part of the sequence data in which duration data indicative of a time interval between adjacent tone generation events, and tone generation data are alternately arranged. Further, the tone generation data is formed of a key code indicative of tone pitch, and a gate time indicative of length of tone generation, with part designating information (flag) attached thereto. Tone color parameters, not shown, of each part are written at the leading end of the tone generation data of the part. The musical composition data in the second format is also not necessarily required to have the above-mentioned four parts, but only required to have two or more parts.

The musical composition-reproducing section 15 having the first configuration shown in FIG. 2 is capable of reproducing musical compositions based on musical composition data shown in FIGS. 4(*a*) and 4(*b*). In the musical composition-reproducing section 15, an interface (I/F) 30 provides interface for transmitting and receiving various data via a bus 26, thereby supplying musical composition data received from the system CPU 10 to a read/write (R/W) controller 31, and supplying a power save signal received from the battery voltage level detector 24 to a power save control section 36.

The R/W controller 31 controls the reading/writing of sequence data from/into a temporary storage section (T-RAM) 32, i.e. controls a read address location of the T-RAM at which the sequence data is read out and a write address location of the same at which sequence data is written. That is, the R/W controller 31 writes sequence data forming musical composition data supplied from the interface 30 into the T-RAM 32, and sequentially reads out the sequence data from the T-RAM 32 in response to a read request signal (Req) from a sequencer 33 to sequentially supply the read sequence data to the sequencer 33.

Further, when the musical composition-reproducing section 15 is initialized (when musical composition data is initially set), tone color parameters of each part supplied from the interface 30 are set to a corresponding one of first to fourth musical tone synthesis sections 34*a* to 34*d* of a musical tone synthesis means 34, which reproduces musical tone data of the part, via the R/W controller 31 and the sequencer 33, and at the same time, a predetermined amount of sequence data is stored in a free area of the T-RAM 32 under the control of the R/W controller 31.

The sequencer 33 receives sequence data of each part read out by the R/W controller 31, and sets tone generator parameters based on the sequence data to a corresponding one of the first to fourth musical tone synthesis section 34*a* to 34*d*, which is assigned to the part. Then, after waiting for timing of tone generation of the part, the sequencer 33 causes the corresponding one of the first to fourth musical tone synthesis sections 34*a* to 34*d* to start musical tone reproduction, i.e. reproduction of musical tone data of the part. It should be noted that the tone generator parameters include pitch data, and volume data.

The musical tone synthesis means 34 is comprised of the first musical tone synthesis section 34*a* (melody part), the second musical tone synthesis section 34*b* (accompaniment part 1), the third musical tone synthesis section 34*c* (accompaniment part 2), and the fourth musical tone synthesis section 34*d* (rhythm part), and is capable of simultaneously reproducing musical tones of the four parts. As described above, when the musical composition-reproducing section 15 is initialized (musical composition data is initially set therein), tone color parameters of each part supplied from the interface 30 are set to a corresponding one of the first musical tone synthesis section 34*a* (melody part), the second musical tone synthesis section 34*b* (accompaniment part 1), the third musical tone synthesis section 34*c* (accompaniment part 2), and the fourth musical tone synthesis section 34*d* (rhythm part). Then, when reproduction of a musical tone of each part is started, the musical tone data of the part is reproduced under the control of the sequencer 33.

The musical tone data reproduced by the first to fourth musical tone synthesis sections 34*a* to 34*d* are synthesized and converted to an analog musical tone signal by a mixer 35, which is output from the musical composition-reproducing section 15.

The power save control section 36 operates in response to the power save signal received via the bus 26 and the interface 30 from the battery voltage level detector 24 when the monitored voltage level of the batter 25 becomes lower than the reference value, to carry out a power save mode-setting process to set the cellular phone to a power save mode, thereby causing the musical tone synthesis means 34 to reproduce a reduced number of parts to reduce consumption of power of the battery 25. The number of parts reproduced in the power save mode may be set to one, thereby allowing only the first musical tone synthesis section 34*a* (melody part) to carry out musical tone reproduction. To carry out such power save control, switching devices SW1 to SW4 are arranged between the sequencer 33 and the first musical tone synthesis section 34*a* (melody part), the second musical tone synthesis section 34*b* (accompaniment part 1), the third musical tone synthesis section 34*c* (accompaniment part 2), and the fourth musical tone synthesis section 34*d* (rhythm part), respectively.

In the power save mode, the power save control section 36 controls the switching devices SW1 to SW4 such that some of them are open to inhibit supply of tone generator parameters necessary for musical tone reproduction from the sequencer 33 to corresponding ones of the first to fourth musical tone synthesis sections 34*a* to 34*d*. For instance, when the switching devices SW2 to SW4 except the switching device SW1 are opened, only data necessary for reproduction of the melody part are supplied from the sequencer 33 to allow the first musical tone synthesis section 34*a* to reproduce musical tone data of the melody part. However, data necessary for reproduction of the accompaniment part 1, the accompaniment part 2 and the rhythm part are not supplied from the sequencer 33 to the second to fourth musical tone synthesis sections 34*b* to 34*d* to inhibit these sections from reproducing musical tone data of these parts assigned thereto. This makes it possible to cut off power consumed by the second to fourth musical tone synthesis sections 34*b* to 34*d*, thereby reducing the consumption of power of the battery 25.

Next, the reproducing operation of the musical composition-reproducing section 15 will be described assuming that the musical composition data in the first format shown in FIG. 4(*a*) is used for reproduction of musical tone data.

When an incoming call is received or when the user operates the music reproduction button or the call hold button, an interrupt signal for starting reproduction of corresponding musical tone data is supplied to the system CPU 10. In response to the interrupt signal, the system CPU 10 issues a reproduction start signal to the musical composition-reproducing section 15, and at the same time supplies predetermined musical composition data of music (music-on-incoming call when an incoming call has been received, BGM or listening music when the music reproduction button has been operated, and music-on-hold when the call hold button has been operated) which is selected in advance in a manner associated with the interrupt signal to the musical composition-reproducing section 15.

More specifically, a predetermined amount of sequence data from the leading end of sequence data of each part is written by the system CPU 10 into the T-RAM 32 under the control of the R/W controller 31. Further, tone color parameters of each part are set to a corresponding one of the first to fourth musical tone synthesis sections 34*a* to 34*d* via the R/W controller 31 and the sequencer 33.

Then, in response to a read request signal from the sequencer 33, the R/W controller 31 sequentially reads sequence data of each part from the T-RAM 32 and supplies the read sequence data to the sequencer 33. The T-RAM 32 is designed to have a smaller capacity than necessary for storing sequence data of one musical composition, but is capable of storing thirty-two words of sequence data for each part of the musical composition. The sequencer 33 sequentially reads the sequence data from the T-RAM 32 under the control of the R/W controller 31, interprets the read sequence data, and then supplies tone generator parameters corresponding to the sequence data to a corresponding one of the first to fourth musical tone synthesis sections 34*a* to 34*d*. Then, after waiting for timing of tone generation of each part, the sequencer 33 causes a corresponding one of the first to fourth musical tone synthesis sections 34*a* to 34*d* to start musical tone reproduction for the part. Further, in timing corresponding to the end of length of tone generation defined by the sequence data, the sequencer 33 causes a corresponding one of the first to fourth musical tone synthesis sections 34*a* to 34*d* to terminate musical tone reproduction. Musical tone data thus reproduced by the first to fourth musical tone synthesis sections 34*a* to 34*d* are supplied to the mixer 35, which synthesizes these data and converts the resulting data to the analog musical tone signal.

If the cellular phone 1 is set such that the musical composition-reproducing section 15 reproduces a musical composition when an incoming call is received, the musical composition-reproducing process described above is carried out upon receipt of the incoming call and the analog musical tone signal generated as described above is sounded via the incoming call speaker 23 as the music-on-incoming call. If the cellular phone 1 is set such that when the call hold button is operated, a musical composition is reproduced as a music-on-hold by the musical composition-reproducing section 15, the musical composition-reproducing process described above is carried out upon operation of the call hold button by the user, and the analog musical tone signal generated as described above is sounded via the received message speaker 22 as the music-on-hold. At the same time, to send the music-on-hold to a telephone of the calling party, the analog musical tone signal is supplied to the voice processing section 14, and transmitted via the communication section 13 to the calling party. Further, if the cellular phone 1 is set such that when the music reproduction button is operated, the musical composition-reproducing section 15 reproduces a musical composition as a BGM or a listening music, the musical composition-reproducing process described above is carried out upon operation of the musical production button by the user, and the analog musical tone signal generated as described above is sounded via the received message speaker 22 or the incoming call speaker 23 as the BGM or the listening music.

Now, the voltage level of the battery 25 supplying power to the electrically-driven components of the cellular phone 1 is always monitored by the battery voltage level detector 24, and when the monitored voltage level becomes lower than the reference value, the battery voltage level detector 24 sends the power save signal to the power save control section 36 via the bus 26 and the interface 30.

In response to the power save signal received from the battery voltage level detector 24, the power save control section 36 carries out the power save mode-setting process to set the cellular phone 1 to the power save mode, thereby controlling the switching devices SW1 to SW4 such that the musical tone synthesis means 34 reproduces a reduced number of parts to reduce the consumption of power stored in the battery 25. The number of parts reproduced in the power save mode may be set as desired, and may be progressively decreased according to the degree of lowering of the voltage level of the battery 25. Further, even when the number of parts reproduced is reduced, the power save control section 36 causes at least the switching device SW1 alone to continue to be closed so as to allow the melody part to be reproduced.

When the power save mode is set, a message notifying the user of this fact is displayed on the display 18, and under the control of the power save control section 36, some of the switching devices SW1 to SW4 (SW2 to SW4 in the case of the present embodiment) are opened to inhibit supply of data necessary for musical tone reproduction from the sequencer 33 to corresponding ones of the first to fourth musical tone synthesis sections 34*a* to 34*d* (the second to fourth musical tone synthesis sections 34*b* to 34*d* in the case of the present embodiment). As a result, parts corresponding to the opened ones of the switching devices SW1 to SW4 are no longer reproduced. However, in the present embodiment, the melody part alone, which is the most important part of all, is controlled to be always reproduced. This makes it possible to cut off power consumed by the second to fourth musical tone synthesis sections 34*b* to 34*d*, thereby reducing the consumption of power of the battery 25.

Further, if the musical composition-reproducing section 15 is not reproducing musical tone data when the power save mode is set, the switching devices SW1 to SW4 are controlled to be opened and closed when the musical composition-reproducing section 15 is initialized (musical composition data is initially set therein) upon supply of the reproduction start signal to the section 15 from the system CPU 10. This makes it possible to reduce the number of parts reproduced. In the present example, it is assumed that the musical composition data is in the first format, and hence is composed of separate data for respective parts, and therefore, the system CPU 10 may send only portions of the musical composition data for parts to be reproduced to the musical composition-reproducing section 15 when initializing the same. Further, since sequence data is written into the T-RAM 32 on a part-by-part basis, the R/W controller 31 may be configured to select only musical composition data of the parts to be reproduced and write the selected musical composition data into the T-RAM 32.

It should be noted that as soon as a portion of sequence stored in the T-RAM 32 is read out, the read portion is deleted from the T-RAM 32. Therefore, the size of a free area in the T-RAM 32 is increased as the reproduction of a musical composition based on the sequence data proceeds. When a predetermined size of a free area is produced, the R/W controller 31 sends the intervention request (IRQ) signal to the system CPU 10. In response to the IRQ signal, the system CPU 10 reads a predetermined amount of a continued portion of the sequence data, e.g. sixteen words of the same in the case of the predetermined size of the free area corresponding to sixteen words of data, from the RMA 11 or the like, and writes the read data into the free area of the T-RAM 32 under the control of the R/W controller 31. By repeatedly carrying out the above operation, the whole musical composition can be reproduced even though the T-RAM 32 is designed to have a smaller capacity than necessary for storing sequence data of one musical composition. Such reading of sequence data into the T-RAM 32 is carried out on a part-by-part basis.

Assuming that the musical composition-reproducing section 15 constructed according to the first configuration shown in FIG. 2 reproduces musical tone data from musical composition data in the FIG. 4(*b*) format, sequence data in which data of a plurality of parts are mixed is written into the T-RAM 32. Therefore, the sequencer 32 detects a part or parts of the read sequence data, and sets tone generator parameters based on the read sequence data to one or more of the musical tone synthesis sections assigned to the detected part or parts. Thereafter, four parts of musical tones are reproduced at the maximum, by carrying out the same operation as in the reproduction of musical tone data from the musical composition data in the first format, and therefore description thereof is omitted. Further, the operation carried out when the power save mode is set is the same as described above, and therefore description thereof is also omitted.

Further, if the musical composition-reproducing section 15 is not reproducing musical tones when the power save mode is set, the switching devices SW1 to SW4 are controlled to be opened and closed when the musical composition-reproducing section 15 is initialized (musical composition data is initially set therein) upon supply of the reproduction start signal to the section 15 from the system CPU 10 to thereby reduce the number of parts reproduced.

In the musical composition-reproducing section 15 constructed according to the first configuration, the first to fourth musical tone synthesis sections 34*a* to 34*d* may be formed by a single musical tone synthesis section which operates in a time-sharing manner. In this case, a single switching device SW is arranged between the single musical tone synthesis section which operates in a time-sharing manner and the sequencer 33, and the power save control section 36 controls the switching device SW such that the switching device SW turns on in synchronism with timing in which the sequencer 33 outputs necessary data for reproduction of each part to be reproduced.

Next, referring to FIG. 3, description will be made of a second configuration of the musical composition-reproducing section 15 of the FIG. 1 cellular phone 1.

Figure 3:
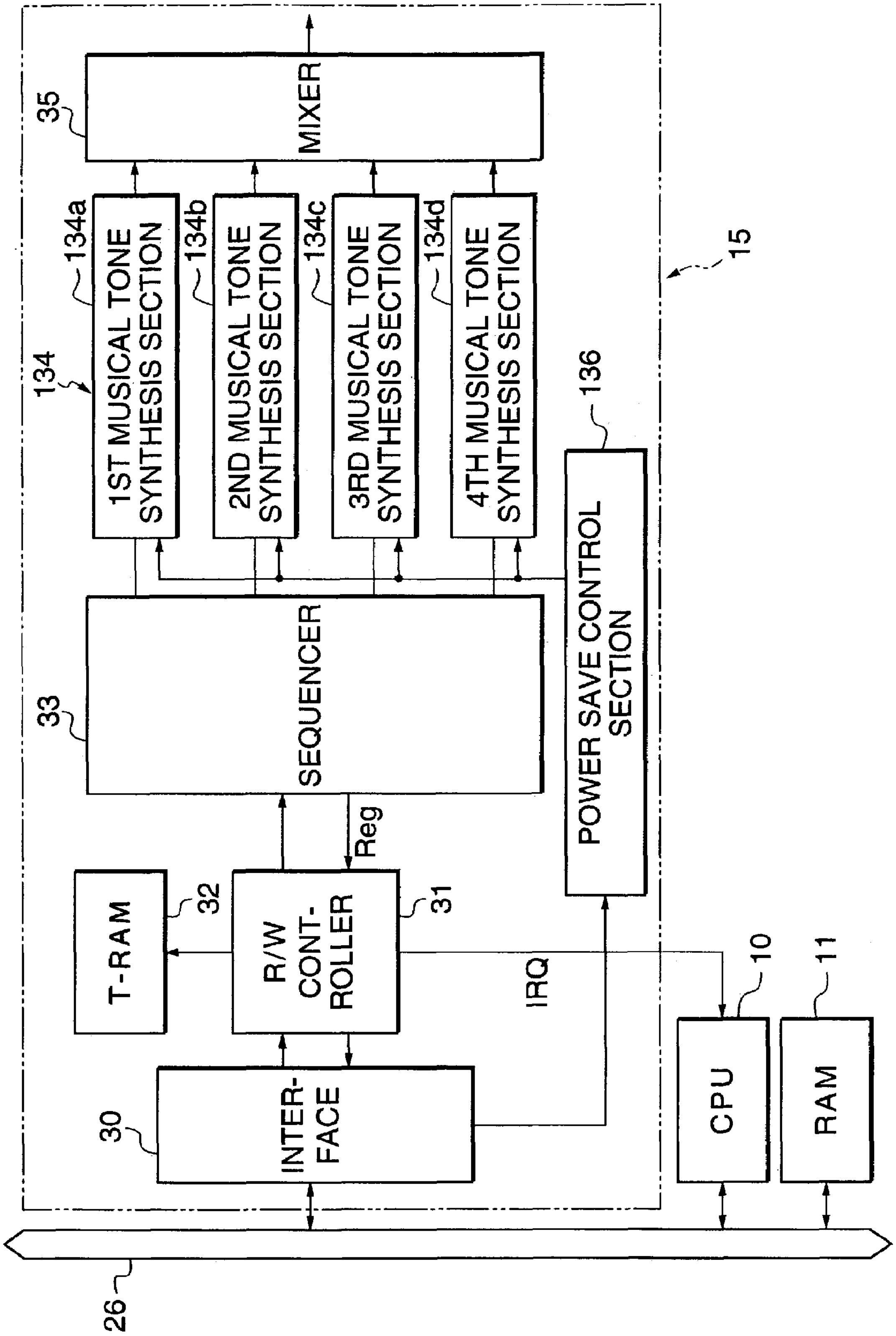
FIG. 3 is a block diagram showing a second configuration of a musical composition-reproducing section of the cellular phone according to the first embodiment.

The musical composition-reproducing section 15 constructed according to the second configuration shown in FIG. 3 is capable of reproducing musical tone data from musical composition data in the formats shown in FIGS. 4(*a*) and 4(*b*). The second configuration is distinguished from the first configuration in that a power save control section 136 controls the power supply to first to fourth musical tone synthesis sections 134*a* to 134*d*. Therefore, the FIG. 3 musical composition-reproducing section 15 has no switching device, and except for this point, it is identical to the FIG. 2 musical composition-reproducing section 15 constructed according to the first configuration.

Now, the operation of the musical composition-reproducing section 15 of the second configuration will be described below assuming that musical tone data is reproduced from musical composition data in the second format.

When the system CPU 10 issues the reproduction start signal to the musical composition-reproducing section 15 in response to an interrupt signal as described above, a predetermined amount of sequence data from the leading end of sequence data formed of mixed data of the four parts is written by the system CPU 10 into the T-RAM 32 under the control of the R/W controller 31. Further, tone color parameters of each part are set to a corresponding one of the first to fourth musical tone synthesis sections 34*a* to 34*d* via the R/W controller 31 and the sequencer 33.

Then, in response to a read request signal from the sequence 33, the R/W controller 31 sequentially reads sequence data formed of mixed data of the four parts from the T-RAM 32 and supplies the read sequence data to the sequencer 33. The T-RAM 32 is designed to have a smaller capacity than necessary for storing sequence data of one musical composition, but is capable of storing thirty-two words of sequence data of a musical composition. The sequencer 33 sequentially reads the sequence data from the T-RAM 32 under the control of the R/W controller 31, interprets the read sequence data, and then supplies tone generator parameters based on the sequence data to a corresponding one of the first to fourth musical tone synthesis sections 134*a* to 134*d* assigned to the part. Then, after waiting for timing of tone generation of each part, the sequencer 33 causes a corresponding one of the first to fourth musical tone synthesis sections 134*a* to 134*d* to start musical tone reproduction, i.e. reproduction of musical tone data of the part. Further, in timing corresponding to the end of length of tone generation of a part defined by sequence data, the sequencer 33 causes a corresponding one of the first to fourth musical tone synthesis sections 134*a* to 134*d* to terminate musical tone reproduction of the part. Musical tone data thus reproduced by the first to fourth musical tone synthesis sections 134*a* to 134*d* are supplied to the mixer 35 which synthesizes these data and converts the resulting data to the analog musical tone signal.

Depending on the configuration of the cellular phone 1 for musical composition reproduction, the musical composition-reproducing process described above is carried out to form an analog musical tone signal, which is sounded in the same manner as described above concerning the first configuration of the musical composition-regenerating section 15 assuming that the section 15 reproduces musical tone data from musical composition data in the first format.

In response to the power save signal received via the bus 26 and the interface 30 from the battery voltage level detector 24, the power save control section 136 carries out the power save mode-setting process to set the cellular phone 1 to the power save mode in which the power supply to the first to fourth musical tone synthesis sections 134*a* to 134*d* is controlled such that a reduced number of parts is reproduced to reduce the drainage of the battery 25. The number of parts reproduced in the power save mode may be set as desired, and may be progressively decreased by decreasing the number of the musical tone synthesis sections to which power is supplied, according to the degree of lowering of the voltage level of the battery 25. Further, even when the number of parts reproduced is reduced, the power save control section 136 causes the power to be supplied to at least the first musical tone synthesis section 134*a* to allow the melody part to continue to be reproduced.

When the power save mode is set, a message notifying the user of this fact is displayed on the display 18, and at the same time, under the control of the power save control section 136, the power is inhibited from being supplied to some of the first to fourth musical tone synthesis sections 134*a* to 134*d* (the second to fourth musical tone synthesis sections 134*b* to 134*d* in the case of the present embodiment). As a result, parts corresponding to the ones of the first to fourth musical tone synthesis sections 134*a* to 134*d* to which power is no longer supplied are not reproduced. However, in the present embodiment, to allow at least the melody part alone, which is the most important part of all, to continue to be reproduced, the power supply to the first musical tone synthesis section 134*a* is always carried out. This makes it possible to cut off power consumed by the second to fourth musical tone synthesis sections 34*b* to 34*d* to which the power is now inhibited from being supplied, thereby reducing the consumption of power of the battery 25.

Further, if the musical composition-reproducing section 15 is not reproducing musical tones when the power save mode is set, a musical composition-reproducing section to which the power is to be supplied is selected when the musical composition-reproducing section 15 is initialized (musical composition data is initially set therein) upon supply of the reproduction start signal to the section 15 from the system CPU 10 to thereby reduce the number of parts reproduced.

The operation of the R/W controller 31 sending the intervention request (IRQ) signal to the system CPU 10 is the same as described hereinabove as to the first configuration of the musical composition-reproducing section 15, and therefore, description thereof is omitted.

When the musical composition-reproducing section 15 of the second configuration shown in FIG. 3 reproduces musical tones from the musical composition data in the first format, sequence data of each part is written into the T-RAM 32 on a part-by-part basis. Therefore, the sequencer 33 detects a part of sequence data based on an address location from which the sequence data is read, and sets tone generator parameters based on the sequence data to one of the first to fourth musical tone synthesis sections 134*a* to 134*d* which is assigned to the detected part. Thereafter, four parts of musical tones are reproduced at the maximum by carrying out the same operation as in the reproduction of musical tones from musical composition data in the second format. However, the operation is the same as carried out when musical tones are reproduced from the musical composition data in the second format, and hence description thereof is omitted.

In the musical composition-reproducing section 15 constructed according to the second configuration, the first to fourth musical tone synthesis sections 134*a* to 134*d* may be formed by a single musical tone synthesis section which operates in a time-sharing manner. In this case, the power save control section 136 controls the supply of power to the single musical tone synthesis section which operates in a time-sharing manner, in synchronism with timing in which the sequencer 33 outputs data necessary for reproduction of each part to be reproduced.

In the musical composition-reproducing sections 15 according to the first and second configurations, the sequencer 33 detects a part of sequence data read from the T-RAM 32, and sets tone generator parameters based on the sequence data to a corresponding one of the first to fourth musical tone synthesis sections 134*a* to 134*d*, which is assigned to the detected part. Therefore, by supplying a control signal from the power save control section 36 (136) to the sequencer 33, data necessary for reproduction of musical tone data can be selectively supplied to one of the first to fourth musical tone synthesis sections 34*a* (134*a*) to 34*d* (134*d*). That is, by causing the sequencer 33 to supply data necessary for musical tone reproduction to musical tone synthesis sections assigned to the four parts, it is possible to control the number of parts to be reproduced. This makes it possible to dispense with the switching devices SW1 to SW4. Further, musical tone synthesis sections which are not supplied with data necessary for musical tone reproduction do not consume almost any power, so that means provided in the second configuration for controlling power supply to the musical tone synthesis means 134 can be omitted.

In the above musical composition-configuring section 15, even when the power save mode is set during musical tone reproduction by the section 15, the number of parts reproduced can be decreased, thereby enabling reduction of consumption of power of the battery 25. It should be noted that if the cellular phone 1 is configured such that the reduction of consumption of power of the battery 25 is inhibited when the battery voltage level detector 25 issues the power save signal during the musical tone reproduction, and if only musical composition data in the first format shown in FIG. 4(*a*) is used for reproduction of a musical composition, the configuration of the musical composition-reproducing section 15 can be simplified.

More specifically, when the musical composition-reproducing section 15 is initialized (musical composition data is initially set therein) upon supply of the reproduction start signal to the section 15 from the system CPU 10, among musical composition data of parts prepared separately for respective parts, only musical composition data of parts reproduced depending on the power save mode or the normal mode is transmitted from the CPU 10 to the musical composition-reproducing section 15. In this case, only the parts for which musical composition data are supplied from the system CPU 10 to the musical composition-reproducing section 15 are reproduced, which makes it possible to dispense with other means for execution of the power save mode. Further, as an alternative to this variation, the R/W controller 31 may write only musical composition data of parts reproduced depending on the power save mode or the normal mode into the T-RAM 32. In this case as well, only the parts for which musical composition data are written in the T-RAM 32 are reproduced, which makes it possible to dispense with other means for execution of the power save mode.

Figure 5:
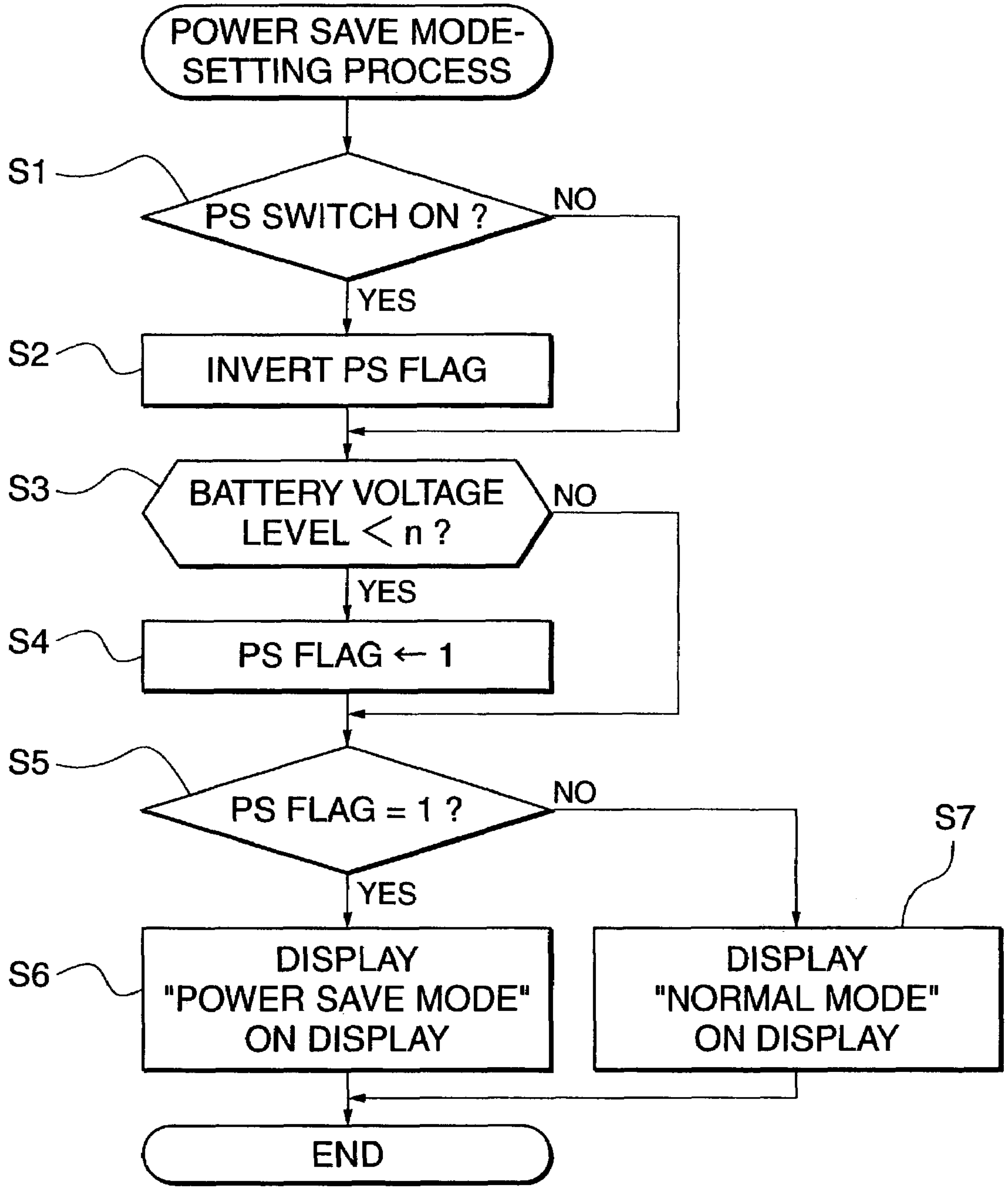
FIG. 5 is a flowchart showing a power save mode-setting process carried out by the cellular phone according to the first embodiment.

Next, referring to FIG. 5, description will be made of the power save mode-setting process, which is actuated when the power save control section 36 receives the power save signal, or the user operates the power save switch, will be described.

When the power save mode-setting process is started, it is determined at a step S1 whether or not the power save switch (PS switch) is in on state. If the PS switch has been turned on by the user, a power save flag (PS flag) is inverted at a step S2. If the PS switch has not been turned on by the user, the program skips the step S2 over to a step S3, wherein it is determined whether or not the battery voltage is lower than a reference value n. If the power save signal indicating that the voltage of the battery 25 is lower than the reference value n has been received from the battery voltage level detector 24, the program proceeds to a step S4, wherein the PS flag is set to "1". If the power save signal has not been received from the battery voltage level detector 24, the program skips the step S4.

Then, at a step S5, it is determined whether or not the value of the PS flag assumes "1". When the PS flag has been inverted at the step S2 to be set to "1", or when the same has been set to "1" at the step S4, the answer to the question of the step S5 is affirmative (YES), and the program proceeds to a step S6, wherein "Power Save Mode" is displayed on the display 18, followed by terminating the present program. If it is not determined at the step S5 that the PS flag assumes "1", the program proceeds to a step S7, wherein "Normal Mode" is displayed on the display 18, followed by terminating the program.

It should be noted that at the step S2, whenever the user operates the PS switch, the PS flag is inverted, whereby the power save mode and the normal mode can be selected as desired. However, when the voltage level of the battery 25 is lower than the reference value n, the PS flag is necessarily set to "1", at the step S4, thereby setting the power save mode.

Figure 6:
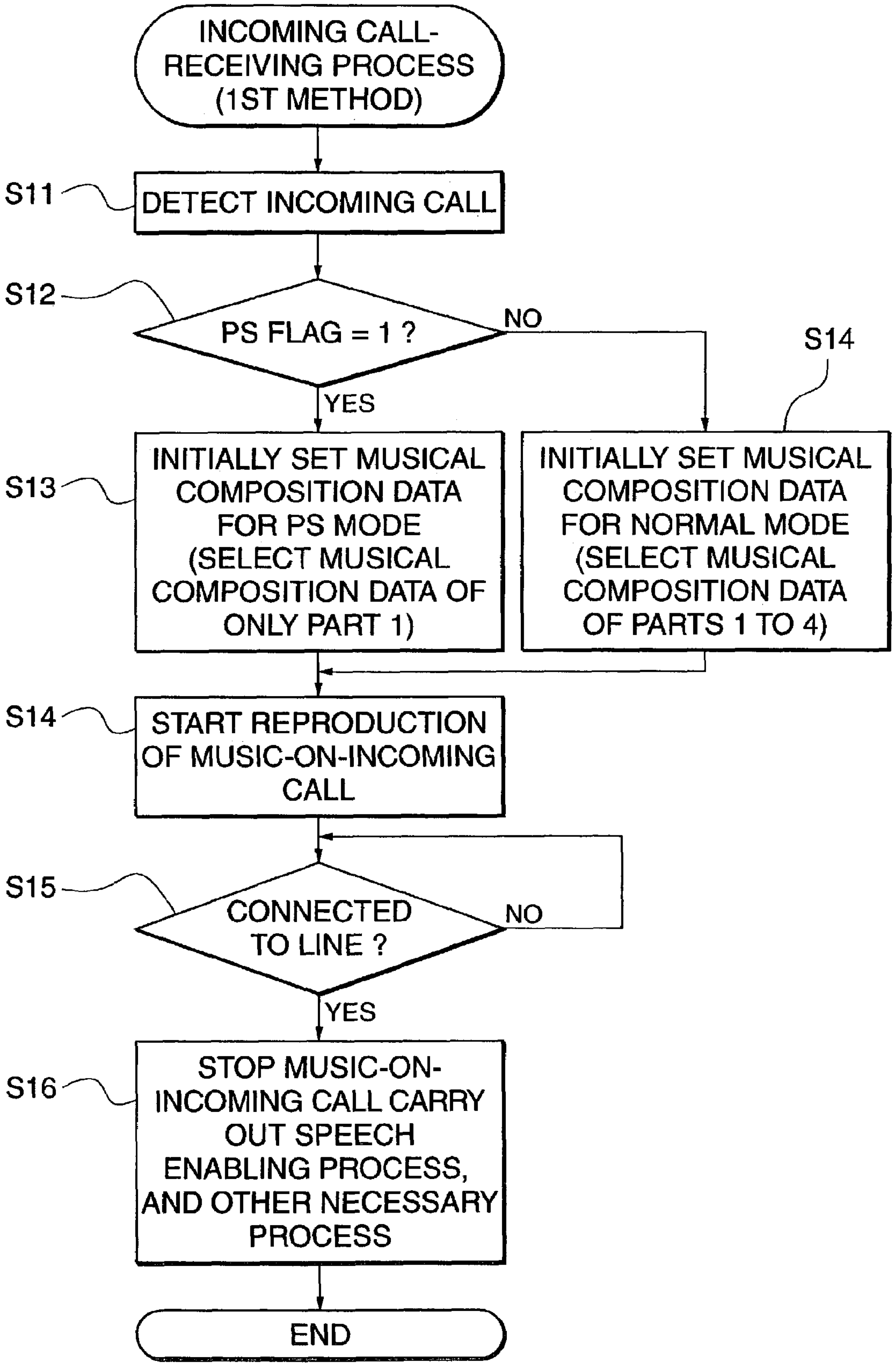
FIG. 6 is a flowchart showing an incoming call-receiving process (first method) carried out by the cellular phone according to the first embodiment.

Next, referring to FIG. 6, description will be made of an incoming call-receiving process (first method) which is executed upon receipt of an incoming call. This incoming call-receiving process (first method) is carried out when musical composition data in the first format shown in FIG. 4(*a*) is used.

When the cellular phone 1 receives an incoming call to start the incoming call-receiving process, the incoming call is detected at a step S1, and it is determined at a step S12 whether or not the PS flag assumes "1". If the power save mode has been set and hence the PS flag assumes "1", the program proceeds to a step S13, wherein musical composition data is initially set for the power save mode (PS mode). In this initial setting of the musical composition data for the PS mode, only sequence data of the part 1 of the musical composition data selected for a music-on-incoming call is sent to the musical composition-reproducing section 15, and written into the T-RAM 32. Further, tone color parameters of the part 1 are set to the first musical tone synthesis section 34*a* (134*a*). Further, a process for selecting only the part 1 (melody part) for reproduction is carried out. More specifically, only the switching device SW1 arranged before the first musical tone synthesis section 34*a* is turned on, or the power is supplied to the first musical tone synthesis section 134*a* alone.

On the other hand, if the normal mode has been set and hence the PS flag assumes "0", the program proceeds from the step S12 to a step S14, wherein musical composition data is initially set for the normal mode. In this initial setting of the musical composition data for the normal mode, the musical composition data selected for the music-on-incoming call is supplied to the musical composition-reproducing section 15, and sequence data thereof is written into the T-RAM 32. Further, tone color parameters of the four parts are set to the first to fourth musical tone synthesis section 34*a* (134*a*) to 34*d* (134*d*). Further, a process for selecting all the parts for musical tone reproduction are carried out. More specifically, the switching devices SW1 to SW4 arranged before the first to fourth musical tone synthesis sections 34*a* to 34*d* are turned on, or the power is supplied to all of the first to fourth musical tone synthesis sections 134*a* to 134*d*. Then, the program proceeds to a step S15, wherein an instruction for starting the reproduction of the music-on-incoming call is supplied to the musical composition-reproducing section 15, and the sequencer 33 reads sequence data from the T-RAM to set tone generation parameters to the first musical tone synthesis section 34*a* (134*a*) selected at the step S13 or all of the first to fourth musical tone synthesis sections 34*a* (134*a*) to 34*d* (134*d*), for staring the reproduction. This causes the music-on-incoming call to be reproduced and sounded via the incoming call speaker 23.

If the user operates the connection button when listening to the music-on-incoming call, it is determined at a step S16 that the cellular phone is connected to a line, so that the program proceeds to a step S17, wherein an instruction for terminating the reproduction of the music-on-incoming call is supplied to the musical composition-reproducing section 15 to clear all the flags and data set to the musical composition-reproducing section 15. At the same time, the T-RAM 32 is also cleared. Then, a speech enabling process for enabling communication the calling party and other necessary processes are carried out, followed by terminating the incoming call-receiving process. It should be noted that until the user operates the connection button, the program is inhibited from proceeding to the step S17, so that the music-on-incoming call continues to be sounded.

Figure 7:
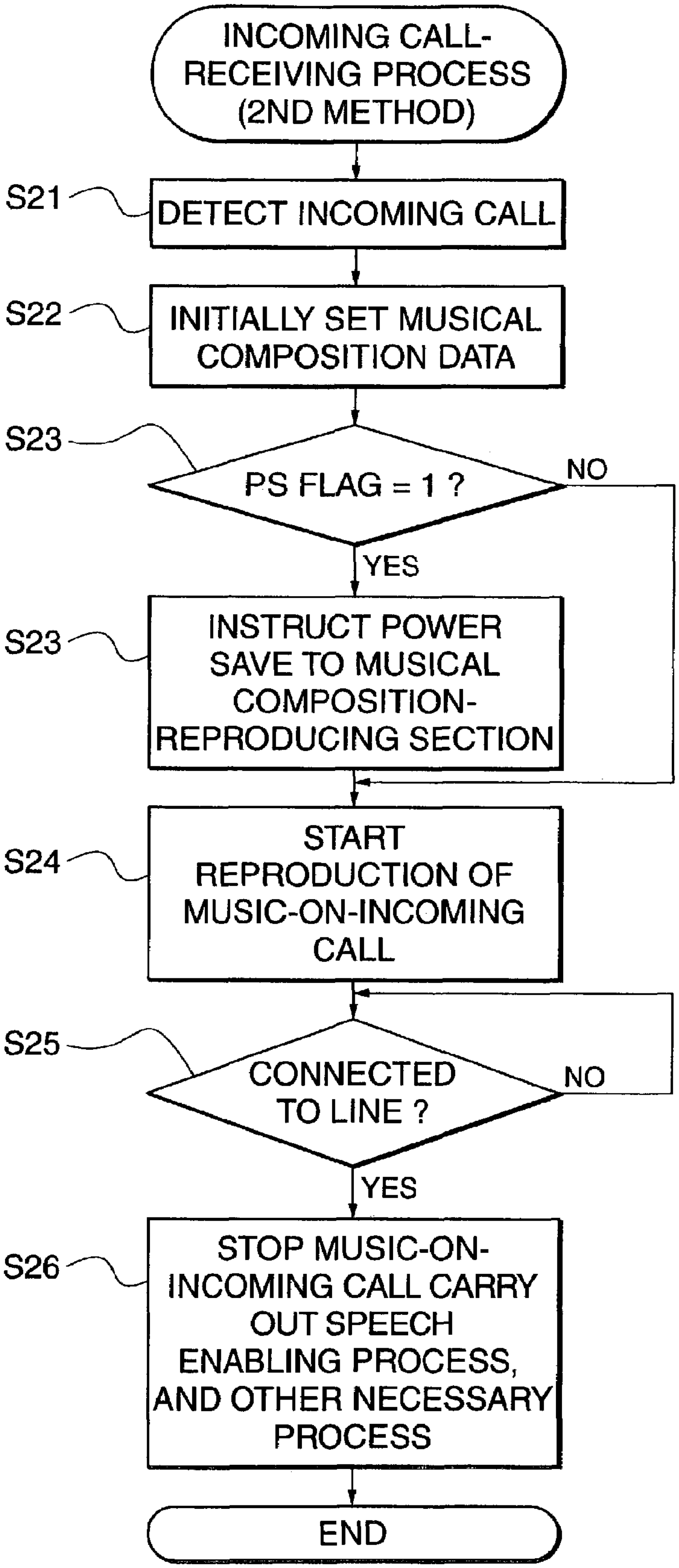
FIG. 7 is a flowchart showing an incoming call-receiving process (second method) carried out by the cellular phone according to the first embodiment.

Next, referring to FIG. 7, description will be made of an incoming call-receiving process (second method) carried out when musical composition data in the second format shown in FIG. 4(*b*) is used.

When the cellular phone 1 receives an incoming call to start the incoming call-receiving process, the incoming call is detected at a step S21, and then musical composition data is initially set at a step S22. In the initial setting of musical composition data, the musical composition data selected for the music-on-incoming call is sent to the musical composition-reproducing section 15 and written into the T-RAM 32. Further, tone color parameters of the four parts are set to the first to fourth musical tone synthesis sections 34*a* to 34*d*. Then, it is determined at a step S23 whether or not the PS flag assumes "1". If the power save mode has been set and hence the PS flag assumes "1", the program proceeds to a step S24, wherein an instruction for execution of the power save control is sent to the power save control section 36 (136) of the musical composition-reproducing section. In response to this instruction, the power save control section 36 (136) carries out a process for selecting, for example, the part 1 (melody part) alone for musical tone reproduction. More specifically, only the switching device SW1 arranged before the first musical tone synthesis section 34*a* is turned on, or the power is supplied to the first musical tone synthesis section 134*a* alone. Then, the program proceeds to a step 25.

On the other hand, when the normal mode has been set and hence the PS flag assumes "0", the program skips the step S24 over to the step S25. At the step S25, an instruction for starting the reproduction of the music-on-incoming call is supplied to the musical composition-reproducing section 15, and the sequencer 33 reads sequence data from the T-RAM 32 to cause the musical tone synthesis means 34 (134) to start reproduction of musical tone data from the musical composition data. In this case, if the power save mode has been set and the step S24 has been executed, only the first musical tone synthesis section 34*a* (134*a*) alone is caused to carry out musical tone reproduction, whereas if the normal mode has been set and the step S24 has been skipped, all of the first to fourth musical tone synthesis sections 34*a* (134*a*) to 34*d* (134*d*) are caused to carry out musical tone reproduction. This causes the music-on-incoming call to be reproduced and sounded via the incoming call speaker 23.

If the user operates the connection button when listening to the music-on-incoming call, it is determined at a step S26 that the cellular phone 1 is connected to a line, so that the program proceeds to a step S27, wherein an instruction for terminating the reproduction of the music-on-incoming call is supplied to the musical composition-reproducing section 15 to clear all the flags and data set to the musical composition-reproducing section 15. At the same time, the T-RAM 32 is also cleared. Then, the speech enabling process for enabling communication with the calling party and the other necessary processes are carried out, followed by terminating the incoming call-receiving process. It should be noted that until the user operates the connection button, the program is inhibited from proceeding to the step S27, so that the music-on-incoming call continues to be sounded.

Next, a cellular phone to which is applied a mobile device according to a second embodiment of the invention will be described. In the second embodiment, component parts corresponding to those of the first embodiment are designated by identical reference numerals and detailed description thereof is omitted.

In the present embodiment, when the voltage level of the batter 25 becomes lower, the system CPU 10 carries out a volume compensating process instead of the power saving process. Further, when the monitored voltage level of the battery 25 becomes lower than a reference value, the battery voltage level detector 24 delivers a volume-compensating signal indicative of the lowering of the battery voltage level to the system CPU 10 or the musical composition-reproducing section 15. In response to the signal, the musical composition-reproducing section 15 is controlled such that the volume level of musical tones reproduced by the section 15 is prevented from becoming lower, to thereby prevent degradation of the quality of the reproduced musical tones.

Figure 8:
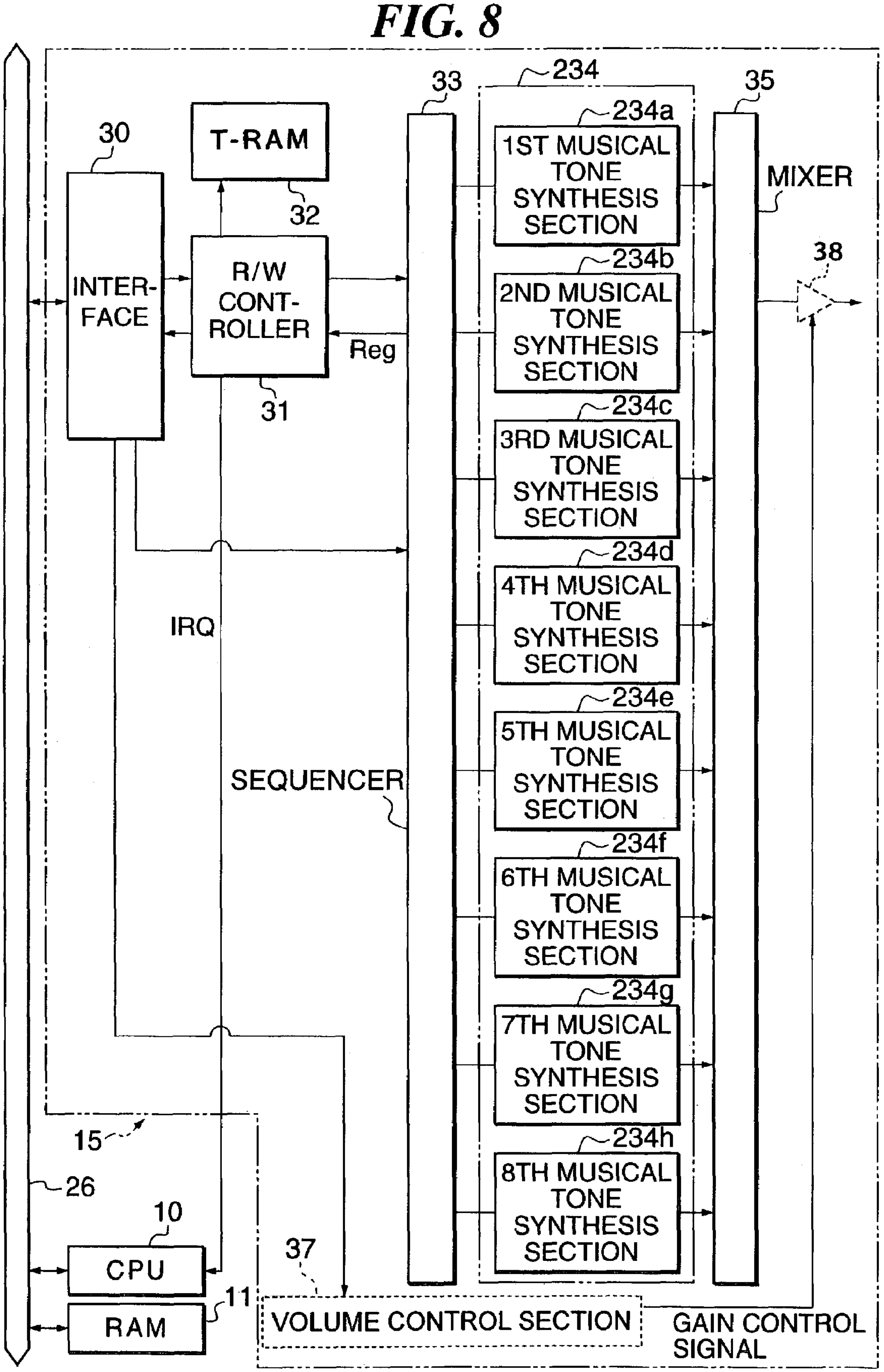
FIG. 8 is a block diagram showing a configuration of a musical composition-reproducing section of a cellular phone according to a second embodiment of the invention.

FIG. 8 shows a configuration of the musical composition-reproducing section 15 according to the present embodiment. This musical composition-reproducing section 15 is also capable of reproducing musical tones from both of musical composition data in the first format and musical composition data in the second format in FIG. 4(*a*) and FIG. 4(*b*). Further, the volume-compensating signal delivered from the battery voltage level detector 24 is input via the interface 30 to the sequencer 33 or a volume control section 37.

A musical tone synthesis means 234 is comprised of eight musical tone synthesis sections, i.e. first to eighth musical tone synthesis sections 234*a* to 234*hi*, and is capable of simultaneously reproducing two series of musical composition data each composed of a melody part, an accompaniment part 1, an accompaniment part 2, and a rhythm part. This is for allowing the musical tone synthesis means 234 to simultaneously reproduce musical tones based on two series, i.e. an original and a duplicate, of musical composition data formed of four parts so as to prevent lowering of the volume of musical tones reproduced by the musical composition-reproducing section 15 when the voltage level of the battery 25 lowers below the reference value. That is, when the voltage level of the battery 25 lowers, the volume of musical tones reproduced by the musical composition-reproducing section 15 also lowers. To cope with this, one part is assigned to an intrinsic corresponding musical tone synthesis section and a musical tone synthesis section which is not assigned to any part, and the musical tones reproduced by the two musical tone synthesis sections are superposed upon each other to compensate for the lowered volume of the reproduced musical composition.

The duplication of musical composition data is carried out by the system CPU 10 in response to the volume-compensating signal. That is, at the start of reproduction of a musical composition, the system CPU 10 duplicates original musical composition data formed of four parts, thereby forming eight parts of musical composition data in total, and forwards the resulting twofold of the original musical composition data to the musical composition-reproducing section 15. The eight parts of musical composition data are formed, for example, by converting a first part to a fifth part, a second part to a sixth part, a third part to a seventh part, and a fourth part to an eighth part, and the four parts thus obtained are combined with the original four parts to form musical composition data composed of first to eighth parts.

Further, instead of duplicating musical composition data by the system CPU 10, the sequencer 33 may be configured to assign two musical tone synthesis sections to each of the four parts of musical composition data for reproduction of the part by the two musical tone synthesis sections.

For instance, when sequence data of the first part is read from the T-RAM 32, the sequencer 33 sets the data to the first musical tone synthesis section 234*a* and the fifth musical tone synthesis section 234*e*. When sequence data of the second part is read from the same, the sequencer 33 sets the data to the second musical tone synthesis section 234*b* and the sixth musical tone synthesis section 234*f*. When sequence data of the third part is read from the same, the sequencer 33 sets the data to the third musical tone synthesis section 234*c* and the seventh musical tone synthesis section 234*g*. When sequence data of the fourth part is read from the same, the sequencer 33 sets the data to the fourth musical tone synthesis section 234*d* and the eighth musical tone synthesis section 234*h*. This causes each part to be reproduced by two musical tone synthesis sections, and by superposing the musical tones thus reproduced, it is possible to compensate for the lowered volume of the reproduced musical tone of the musical composition. It should be noted that in this case, the volume-compensating signal is sent to the sequencer 33 via the interface 30, and in response to this signal, the sequencer 33 carries out the operation of compensating for the lowered volume as described above.

Further, the musical tone data reproduced by the first to eighth musical tone synthesis sections 234*a* to 234*h* are synthesized by the mixer 35, and amplified by a variable-gain amplifier 38, as required.

The volume control section 37 is configured to be capable of controlling the gain of the variable-gain amplifier 38. More specifically, if the volume control section 37 receives the volume-compensating signal delivered from the battery voltage level detector 24 via the interface 30, a gain control signal is supplied to the variable-gain amplifier 38 to increase the gain thereof. This can compensate for lowering of the volume level of musical tones reproduced by the musical composition-reproducing section 15 due to the lowered voltage level of the battery 25, since the gain of the variable-gain amplifier 38 is controlled to be increased in such a case. Thus, the combination of the volume control section 37 and the variable-gain amplifier 38 can also compensate for the lowered volume of the reproduced musical tones caused by lowered voltage level of the battery 25. In this case, the musical tone synthesis means 234 is not required to reproduce each single part by using two musical tone synthesis sections thereof, and hence the musical tone synthesis means 234 may be formed by four musical tone synthesis sections. Further, conversely, if the musical tone synthesis means 234 is formed by the eight musical tone synthesis sections 234*a* to 234*h* for compensating for the lowered volume of reproduced musical tones, the volume control block 37 and the variable-gain amplifier 38 may be omitted.

Next, the reproducing operation of the FIG. 8 musical composition-reproducing section 15 will be described, mainly in respect of points different from the reproducing operation of the musical composition-reproducing section 15 according to the first embodiment described above whose two configurations are shown in FIGS. 2 and 3, respectively.

Tone color parameters of each part are set to one or two corresponding ones of the first to eighth musical tone synthesis sections 234*a* to 234*h* via the R/W controller 31 and the sequencer 33.

In this case, when the system CPU 10 has received the volume-compensating signal from the battery voltage level detector 24 in advance, the system CPU 10 duplicates musical composition data e.g. formed of four parts to thereby convert the same into musical composition data formed of eight parts in total when it sends the reproduction start signal to the musical composition-reproducing section 15. Then, the system CPU 10 writes a predetermined amount of sequence data from the leading end of sequence data of each of the eight parts into the T-RAM 32 under the control of the R/W controller 31. Further, tone color parameters of the eight parts of musical composition data are set via the R/W controller 31 and the sequencer 33 to corresponding ones or all of the first to eighth musical tone synthesis sections 234*a* to 234*h*.

The sequencer 33 sequentially reads out sequence data from the T-RAM 32, interprets the read sequence data of each part, and set tone generator parameters corresponding to the sequence data to one or two of the first to eighth musical tone synthesis sections 234*a* to 234*h* assigned to the part. In this case, if the voltage level of the battery 25 is equal to or higher than the reference value, tone color parameters of e.g. four parts, which consititute the musical composition, are set to the first to fourth musical tone synthesis sections 234*a* to 234*d*, and the remaining fifth to eighth musical tone synthesis sections 234*e* to 234*h* are left unassigned to parts.

On the other hand, when the voltage level of the battery 25 is lower than the reference value, and the system CPU 10 has received the volume-compensating signal, the musical composition data is formed e.g. by twofold, i.e. eight parts of the original musical composition data. Tone generator parameters of the eight parts are set to the first to eighth musical tone synthesis sections 234*a* to 234*h*, respectively. In this case, for instance, the melody part is assigned to the first and fifth musical tone synthesis sections 234*a* and 234*e*, the accompaniment part 1 to the second and sixth musical tone synthesis sections 234*b* and 234*f*, the accompaniment part 2 to the third and seventh musical tone synthesis sections 234*c* and 234*g*, and the rhythm part to the fourth and eighth musical tone synthesis sections 234*d* and 234*h*.

Then, after waiting for timing of the tone generation defined by sequence data of each part, the sequencer 33 causes one of the first to eighth musical tone synthesis sections 234*a* to 234*h* assigned to the part to start musical tone reproduction, i.e. reproduction of musical tone data of the part. Further, in timing corresponding to the end of length of tone generation of sequence data of each part, the sequencer 33 causes one of the first to eighth musical tone synthesis sections 234*a* to 234*h* assigned to the part to terminate musical tone reproduction. Musical tone data of four parts or eight parts thus reproduced by the first to eighth musical tone synthesis sections 234*a* to 234*h* are supplied to the mixer 35 for synthesis, and then amplified by the variable-gain amplifier 38, as required, to be output.

The voltage level of the battery 25 that supplies power to the electrically-driven component parts including the musical composition-reproducing section 15 is always monitored by the battery voltage level detector 24. When the monitored voltage level of the battery 25 becomes lower than the reference value, the battery voltage level detector 24 delivers the volume-compensating signal to the system CPU 10, and the CPU 10 carries out duplication of musical composition data selected for reproduction when it delivers the reproduction start signal to the musical tone-reproducing section 15.

Alternatively, the battery voltage level detector 24 may send the volume-compensating signal to the sequencer 33, and the sequencer 33 may carry out the operation for compensating for the lowered volume of the reproduced musical tones. That is, if the sequencer 33 has received the volume-compensating signal, the sequencer 33 sequentially reads out sequence data from the T-RAM 32 via the R/W controller 31, interprets the read sequence data, and sets tone generator parameters based on the read sequence data to two of the first to eighth musical tone synthesis sections 234*a* to 234*h*. This causes each part to be reproduced by two musical tone synthesis sections, and similarly to the case of duplicating musical composition data, it is possible to compensate for the lowered volume level caused by the lowered voltage level of the battery 25. If the sequencer 33 carries out the operation of compensating for the lowered volume of the reproduced musical tone, it is possible to carry out the volume compensation even when the volume-compensating signal is generated during reproduction of musical tones.

Further, the volume control section 37 and the variable-gain amplifier 38 may be arranged in the musical composition-reproducing section 15, and the battery voltage level detector 24 may be disposed to send the volume-compensating signal to the volume control section 37, whereby the volume control section 37 and the variable-gain amplifier 38 may cooperatively carry out the operation of compensating for the lowered volume of the reproduced musical tones. More specifically, when the volume control section 37 receives the volume-compensating signal, it applies the gain control signal to the variable-gain amplifier 38 to increase the gain thereof. This causes the variable-gain amplifier 38 to amplify the musical tone signal delivered from the mixer 35 with an increased amplification factor to thereby compensate for the lowered volume of the reproduced musical tones. If the volume control section 37 and the variable-gain amplifier 38 thus carry out the operation of compensating for the lowered volume of the reproduced musical tone, it is possible to carry out the compensation even when the volume-compensating signal is generated during reproduction of musical tones.

Next, description will be made of the reproducing operation of the FIG. 8 musical composition-reproducing section 15 of the second embodiment carried out using musical composition data in the second format shown in FIG. 4(*b*).

When the system CPU 10 delivers the reproduction start signal to the musical composition-reproducing section 15, this signal is input to the sequencer 33 to start the reproduction of a selected musical composition. The system CPU 10 reads out a predetermined amount of sequence data from the leading end of sequence data of musical composition data of the selected musical composition, and writes the read data into the T-RAM 32 under the control of the R/W controller 31. In this case, sequence data formed of mixed data of a plurality of parts is written into the T-RAM 32. The sequencer 33 detects a part of the read sequence data, and sets tone generation parameters based on the sequence data to one of the first to eighth musical tone synthesis sections 234*a* to 234*h* assigned to the detected part.

Thereafter, if the battery voltage level detector 24 has not delivered the volume-compensating signal (the voltage level of the battery 25 is not low), the musical composition-reproducing section 15 reproduces a musical composition from the musical composition data in the second format in the same manner as a musical composition is reproduced from musical composition data in the first format, and therefore description thereof is omitted.

On the other hand, if the battery voltage level detector 24 has delivered the volume-compensating signal (the voltage level of the battery 25 has lowered), it is impossible to double the number of parts by duplication of musical composition data in the second format since the musical composition data in the second format contains data of the four parts of sequence data mixed and arranged serially with respect to time. To cope with this inconvenience, the sequencer 33 assigns two musical tone synthesis sections to each part of musical composition data when musical tones are to be reproduced from the data of the part.

More specifically, when sequence data of a first part is read out from the T-RAM 32, the sequencer 33 sets tone generator parameters based on the read sequence data of the first part, e.g., to the first and fifth musical tone synthesis sections 234*a* and 234*e*, and similarly, tone generator parameters based on sequence data of a second part to the second and sixth musical tone synthesis sections 234*b* and 234*f*, tone generator parameters based on sequence data of a third part to the third and seventh musical tone synthesis sections 234*c* and 234*g*, and tone generator parameters based on sequence data of a fourth part to the fourth and eighth musical tone synthesis sections 234*d* and 234*h*. Thus, each part is reproduced by two musical tone synthesis sections, and by superposing the reproduced musical tones, it is possible to compensate for the lowered volume of the reproduced musical tones. It should be noted that in this case, the volume-compensating signal is sent to the sequencer 33 via the interface 30, and in response to the volume-compensating signal received, the sequencer 33 carries out the operation of compensating for the lowered volume of the reproduced musical tones in the above described manner. If the sequencer 33 carries out the operation of compensating for the lowered volume of the reproduced musical tones as described above, it is possible to carry out the volume compensation even when the volume-compensating signal is generated during reproduction of musical tones.

The musical tone data reproduced by the first to eighth musical tone synthesis sections 234*a* to 234*h* are supplied to the mixer 35, which synthesizes these data and converts the resulting data to an analog musical signal, which is further amplified by the variable-gain amplifier 38, as required, for outputting.

The combination of the volume control section 37 and the variable-gain amplifier 38 is also capable of compensating for the lowered volume due to the lowered voltage level of the battery 25. The operation in this case is the same as carried out when a musical composition is reproduced from musical composition data in the first format, and hence description thereof is omitted. It should be noted, however, that even when the operation of compensating for lowered volume is carried out by the combination of the volume control section 37 and the variable-gain amplifier 38, it is also possible to carry out the volume compensation even when the volume-compensating signal is generated during reproduction of musical tones.

Although in the FIG. 8 musical composition-reproducing section 15, the musical tone synthesis means 234 is formed of the first to eighth musical tone synthesis sections 234*a* to 234*h*, this is not limitative, but the number of musical tone synthesis sections may be smaller than eight. In such a case, if the musical composition data is formed of four parts, when the voltage level of the battery 25 lowers, at least the melody part, which is the most important part, is assigned with two or more musical tone synthesis sections for reproduction thereof.

Further, in the musical composition-reproducing section 15, the first to eighth musical tone synthesis sections 234*a* to 234*h* may be formed by a single musical tone synthesis section which operates in a time-sharing manner.

Figure 9:
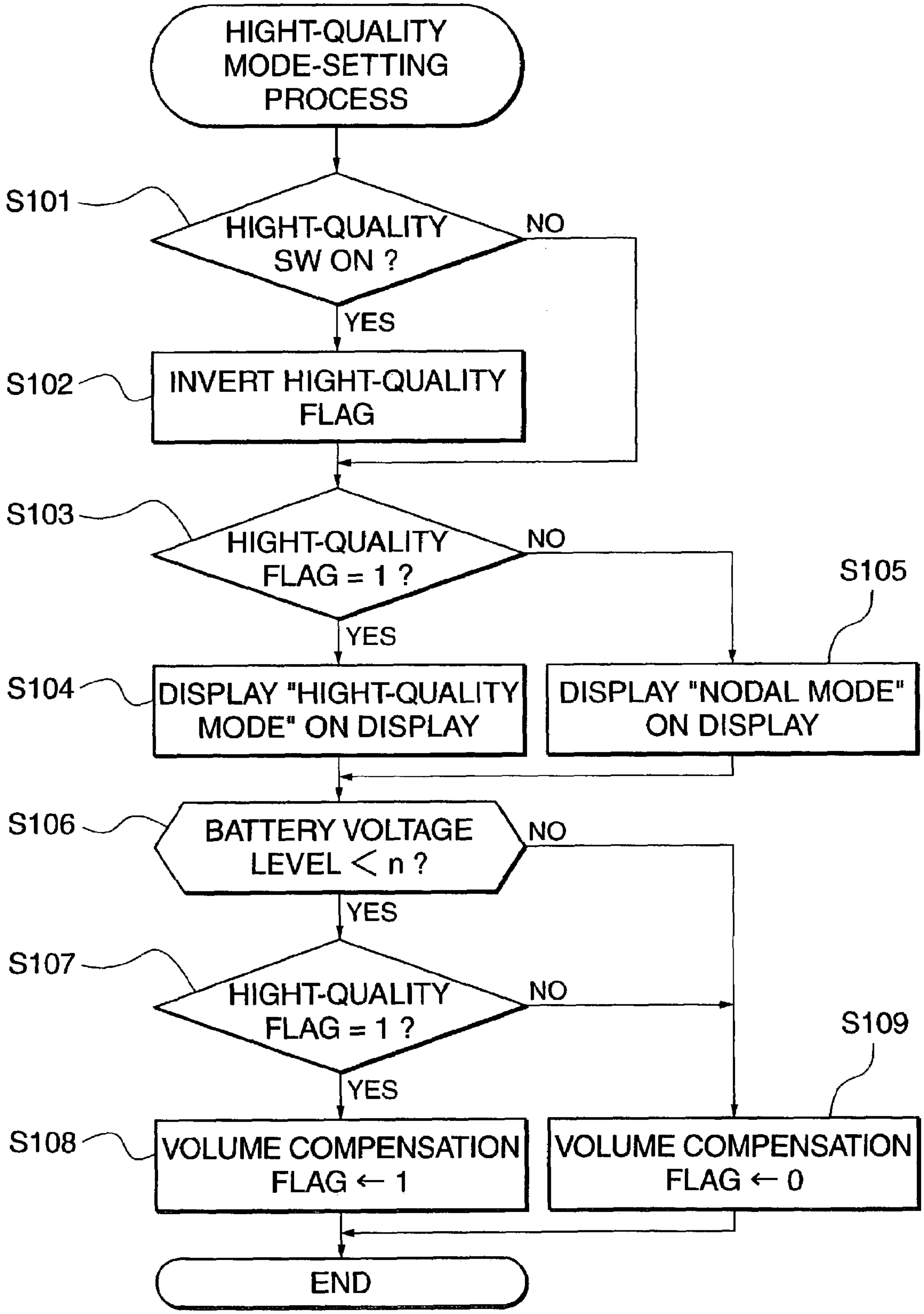
FIG. 9 is a flowchart showing a high-quality mode-setting process carried out by the cellular phone according to the second embodiment.

The battery voltage level detector 24 delivers the volume-compensating signal when the voltage level of the battery 25 lowers. However, whether or not the volume compensation is to be carried out can be set by the user. In the present embodiment, it is assumed that the user can set one of "High Quality Mode" and "Normal Quality Mode". When "High Quality Mode" is set, the volume compensation is carried out, but when "Normal Quality Mode" is set, the volume compensation is not carried out. In the following, referring to FIG. 9, description will be made of a high quality mode-setting process which is actuated when the user changes the mode e.g. by operating a high-quality mode switch.

First, it is determined at a step S101 whether or not the user has operated the high-quality mode switch. If the user has operated this switch, a high-quality mode flag is inverted at a step S102. On the other hand, if the user has not operated the switch, the program skips the step S102 over to a step S103, wherein it is determined whether or not the high-quality mode flag assumes "1". If it is determined here that the high-quality mode flag assumes "1", "High Quality Mode" is displayed on the display 18, and the program proceeds to a step S106. On the other hand, if it is determined that the high-quality mode flag does not assume "1", "Normal Quality Mode" is displayed on the display 18 at a step S105, and then, the program proceeds to the step S106.

At the step S106, it is determined whether or not the voltage level of the battery 25 detected by the battery voltage level detector 24 is lower than the reference value n. This determination is carried out by determining whether or not the battery voltage level detector 24 has issued the volume-compensating signal, and when the signal has been issued, the determination is affirmative (YES), while it has not been issued, the same is negative (NO). Assuming here that the volume-compensating signal has been issued, the program proceeds to a step S107, wherein it is determined whether or not the high-quality mode flag assumes "1". If the high-quality mode flag assumes "1", a volume compensation flag is set to "1" at a step S108, for execution of the volume compensating process when musical tone reproduction is carried out, whereas if the high-quality mode flag does not assume "1", the program proceeds to a step S109, wherein the volume compensation flag is set to "0", to inhibit the execution of the volume compensating process when musical tone reproduction is carried out. Further, when the answer to the question of the step S106 is negative (NO) since the volume-compensating signal has not been issued, the program proceeds to the step S109, wherein the volume compensation flag is set to "0", to inhibit the execution of the volume compensation when musical tone reproduction is carried out. Execution of the step S108 or S109 terminates the high-quality mode-setting process.

It should be noted that at the step S101, whenever the user operates the high-quality mode switch to turn it on, the high-quality mode flag is inverted, whereby the user can select the high quality mode and the normal quality mode as he desires. Then, when the high quality mode has been set and at the same time the voltage level of the battery 25 becomes lower than the reference value n, the volume compensation flag is set to "1", to set the volume compensating process ready for execution.

Figure 10:
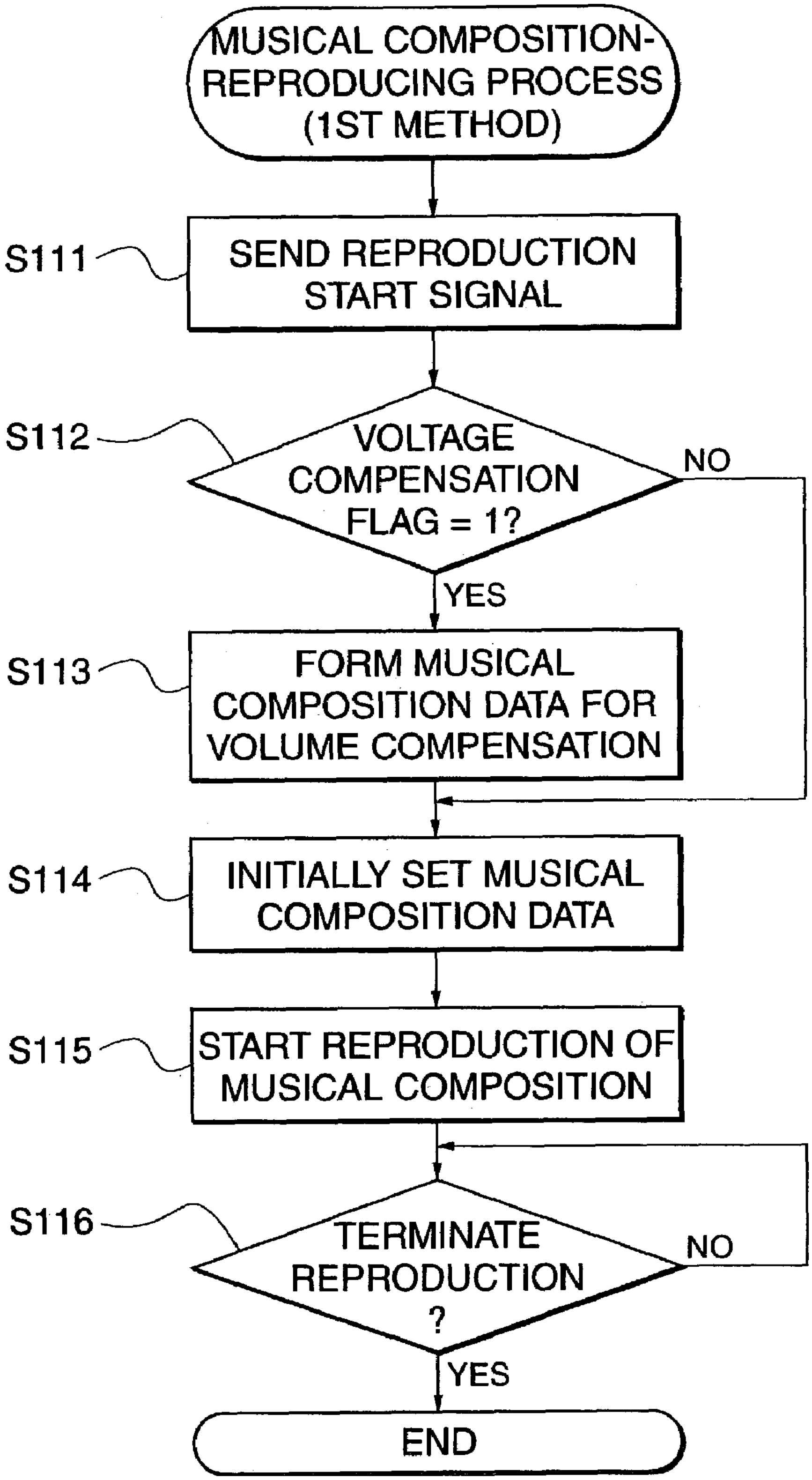
FIG. 10 is a flowchart showing a musical composition-reproducing process (first method) carried out by the cellular phone according to the second embodiment.

Next, referring to FIG. 10, a musical composition-reproducing process (first method) will be described which is actuated when the system CPU 10 issues the reproduction start signal. In this musical composition-reproducing process (first method), musical composition data in the first format shown in FIG. 4(*a*) is used, and the CPU 10 carries out the volume compensating process.

When the music reproduction button of the cellular phone 1 is operated for instructing reproduction of a BGM or a listening music, or an incoming call is received, or the call-hold button is operated, at a step S111, the CPU 10 delivers the reproduction start signal to the musical composition-reproducing section 15. Then, it is determined at a step S112 whether or not the volume compensation flag assumes "1". Assuming here that the high quality mode has been set and at the same time the voltage level of the battery 25 is lower than the reference value n, so that the volume compensation flag has been set to "1", the program proceeds to a step S113, wherein the system CPU 10 carries out a process for producing musical composition data for volume compensation. In this process, if the musical composition data is formed of four parts, the system CPU 10 duplicates these parts to produce musical composition data formed of eight parts.

Then, the program proceeds to a step S114, wherein the musical composition data for volume compensation is initially set. In the initial setting of the musical composition data for volume compensation, the musical composition data doubled in number of parts by the duplication is sent to the musical composition-reproducing section 15, and a leading portion of sequence data of each part is written into the T-RAM 32. Further, tone color parameters of each part are set to a corresponding one of the first to eighth musical synthesis sections 234*a* to 234*h*.

On the other hand, when the normal quality mode is set, or when the voltage level of the battery 25 is equal to or higher than the reference value n and hence the volume compensation flag does not assume "1", the step S113 is skipped, and the original musical composition data from which the musical composition data for volume compensation is produced by duplication is initially set at the step S114. Thus, when the process for initially setting musical composition data is completed, an instruction for starting reproduction of a musical composition is sent to the musical composition-reproducing section 15 at a step S115. This causes the sequencer 33 to read out sequence data from the T-RAM 32, and set tone generation parameters to a corresponding one of the first to eighth musical tone synthesis sections 234*a* to 234*h*, to cause the reproduction of musical tones to be started.

In this case, when the T-RAM 32 stores four parts of sequence data, musical tones formed of the four parts are reproduced. On this occasion, four musical tone synthesis sections of the musical tone synthesis means 234 are left unassigned to parts. On the other hand, when the high quality mode is set, and at the same time the voltage level of the battery 25 becomes lower than the reference value n, so that the T-RAM 32 stores eight parts of sequence data, musical tones of the eight parts are reproduced. On this occasion, the first to eighth musical tone synthesis sections 234*a* to 234*h* for all the parts are used for reproduction of musical tones.

If the reproduction start signal is generated in response to an incoming call received by the cellular phone 1, the reproduced musical tones are sounded via the incoming call speaker 23 as a music-on-incoming call, whereas if the same signal is generated in response to user's call-hold operation, the reproduced musical tones are sounded via the received message speaker 22 as a music-on-hold. Further, if the same signal is generated in response to the user's operation of the musical reproduction button, the reproduced musical tones are sounded via the received message speaker 22 or the incoming call speaker 23, as a BGM or a listening music.

Then, until it is determined at a step S116 that the reproduction of the musical tones should be terminated, the musical composition-reproducing section 15 continues the musical tone reproduction, and when it is determined at the step S116 that the reproduction of the musical tones should be terminated, a reproduction-terminating process is carried out to terminate the musical composition-reproducing process (first method). Cases where it is determined that the reproduction of musical tones should be terminated include, for example, a case where the connection button is operated after an incoming call has been received, a case where the call-hold operation is cancelled, and a case where the reproduction of a BGM or a listening music is completed or instructed to be stopped. In the reproduction-terminating process, a reproduction stop signal is supplied to the musical composition-reproducing section 15, whereby the flags and data within the musical composition-reproducing section 15 are cleared. At the same time, the T-RAM 32 is also cleared.

Figure 11:
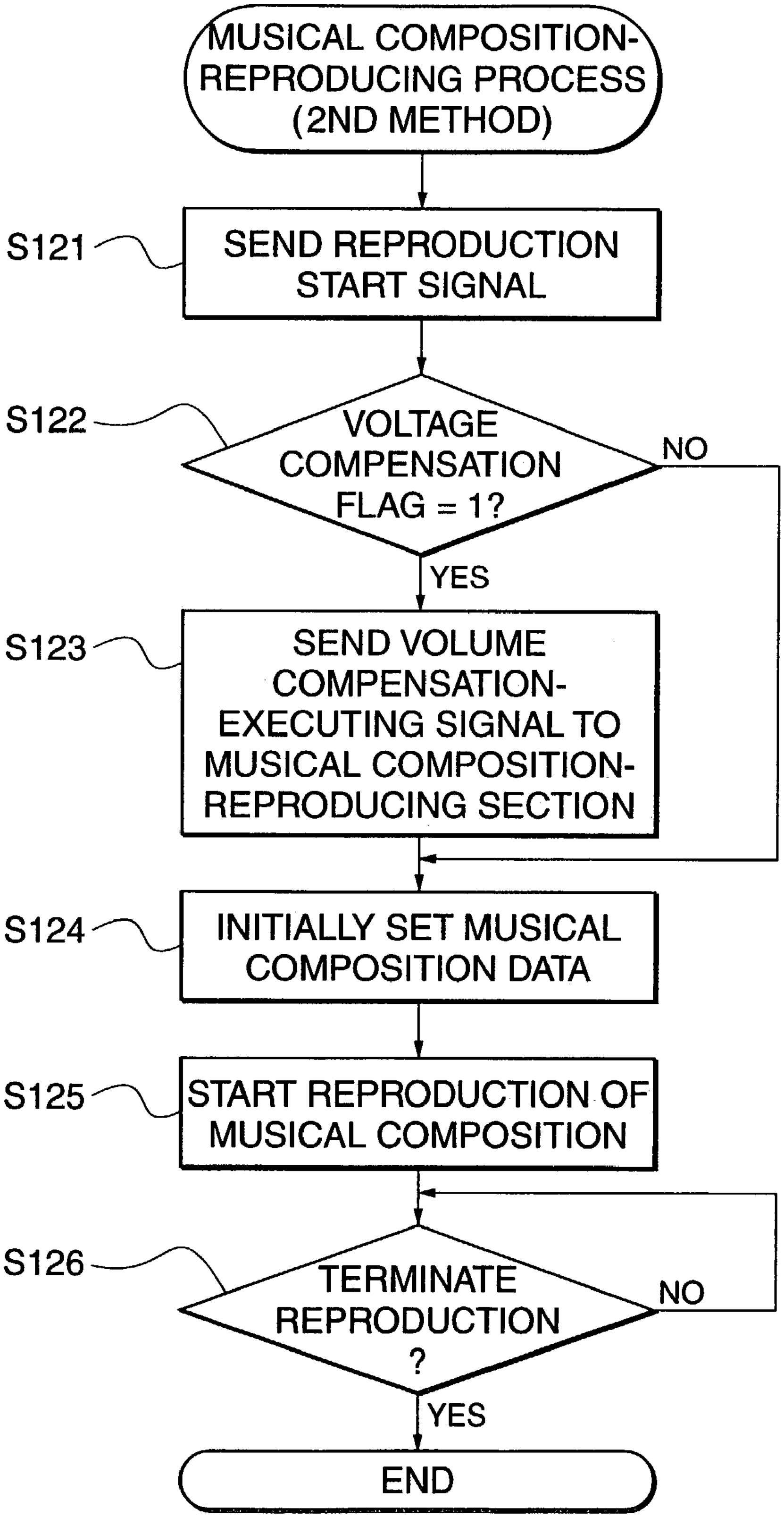
FIG. 11 is a flowchart showing a musical composition-reproducing process (second method) carried out by the cellular phone according to the second embodiment.

Next, referring to FIG. 11, a musical composition-reproducing process (second method) using musical composition data in the second format shown in FIG. 4(*b*) will be described. In this process (second method), the sequencer 33 carries out the volume compensating process.

When the music reproduction button of the cellular phone 1 is operated to instruct reproduction of a BGM or a listening music, or an incoming call is received, or the call-hold button is operated, at a step S121, the CPU 10 delivers the reproduction start signal to the musical composition-reproducing section 15. Then, it is determined at a step S122 whether or not the volume compensation flag assumes "1". Assuming here that the high quality mode has been set and at the same time the voltage level of the battery 25 is lower than the reference value n, so that the volume compensation flag has been set to "1", the program proceeds to a step S123, wherein a volume compensation-instructing process is carried out to send a volume compensation executing signal to the musical composition-reproducing section 15.

On the other hand, when the normal quality mode is set, or when the voltage level of the battery 25 is equal to or higher than the reference value n and hence the volume compensation flag has not been set to "1", the step S123 is skipped, and the program proceeds to a step S124, wherein the musical composition data is initially set. In this process for initially setting musical composition data, musical composition data is supplied to the musical composition-reproducing section 15, and a leading portion of sequence data is written into the T-RAM 32. Further, tone color parameters of each part are set to a corresponding one of the first to eighth musical tone synthesis sections 234*a* to 234*h*.

When the process for initially setting musical composition data is thus completed, the program proceeds to a step S125, wherein an instruction for starting the reproduction of musical tones is sent to the musical composition-reproducing section 15. This causes the sequencer 33 to read out sequence data from the T-RAM 32, and sets tone generation parameters to one of the first to eighth musical tone synthesis sections 234*a* to 234*h* assigned to the part of the sequence data to cause the reproduction to be started.

When this process for starting reproduction of musical tones is carried out, if the volume compensation-instructing process has been carried out at the step S123, the sequencer 33 sequentially reads sequence data from the T-RAM 32 via the R/W controller 31, interprets the read sequence data, and sets tone generator parameters based on the sequence data to two of the first to eighth musical tone synthesis sections 234*a* to 234*h*. Thus, each part is reproduced by two musical tone synthesis sections. On the other hand, if the volume compensation-instructing process has not been carried out at the step S123, the sequencer 33 sequentially reads sequence data from the T-RAM 32 via the R/W controller 31, interprets the read sequence data, and sets tone generator parameters based on the sequence data to one of the first to eighth musical tone synthesis sections 234*a* to 234*h*. Thus, each part is reproduced by one musical tone synthesis section.

As a result, when the high quality mode is set, and at the same time the voltage level of the battery 25 is lower than the reference value n, the musical composition data, which is formed e.g. of four parts, is duplicated to eight parts, and then musical tones are reproduced therefrom, which makes it possible to compensate for the lowered volume of the reproduced musical tones. In this case, all the musical tone synthesis sections are used to reproduce musical tones of all the parts.

If the reproduction start signal is generated in response to an incoming call received by the cellular phone 1, the reproduced musical tones are sounded via the incoming call speaker 23 as a music-on-incoming call, whereas if the same signal is generated in response to the user's call-hold operation, the reproduces musical tones are sounded via the received message speaker 22 as a music-on-hold. Further, if the same signal is generated in response to the user's operation of the musical reproduction button, the reproduced musical tones are sounded via the received message speaker 22 or the incoming call speaker 23, as a BGM or a listening music.

Then, until it is determined at a step S126 that the reproduction of the musical tones should be terminated, the musical composition-reproducing section 15 continues the musical tone reproduction, and when it is determined at the step S126 that the reproduction of the musical tones should be terminated, a reproduction-terminating process is carried out to terminate the musical composition-reproducing process (second method). Cases where it is determined that the reproduction of musical tones should be terminated include, for example, a case where the connection button is operated after an incoming call has been received, a case where the call-hold operation is cancelled, and a case where the reproduction of a BGM or a listening music is completed or instructed to be stopped. In the reproduction-terminating process, the reproduction stop signal is supplied to the musical composition-reproducing section 15, whereby the flags and data within the musical composition-reproducing section 15 are cleared. At the same time, the T-RAM 32 is also cleared.

Although the above description is made mainly based on examples of musical tone data formed of four parts, the musical composition data need not be formed of four parts, but it may be formed e.g. of three parts.

Further, although the musical tone synthesis means 234 is formed of eight musical tone synthesis sections, i.e. first to eighth musical tone synthesis sections 234*a* to 234*h* for the eight parts, the number of musical tone synthesis sections is not limited to this, but the number of musical tone synthesis sections has only to be set to such a number that some musical tone synthesis sections are not assigned to parts when musical tone reproduction is carried out in the normal quality mode. In such a case, when the volume compensating process is carried out, the musical tone synthesis sections not assigned to parts in addition to musical tone synthesis sections for original parts may be assigned to an increased number of parts created by the duplication, in the order of more important parts to less important parts. This makes it possible to compensate for the lowered volume of parts of the musical composition, starting from the most important part to less important parts.

In the cellular phone 1 to which the mobile device according to the above described embodiments of the invention is applied, the system CPU 10 carries out the telephone function process, not shown, as the main process. Even if the system CPU 10 carries out a musical composition reproduction-aiding process for writing sequence data into the musical composition-reproducing section 15 or the volume compensating process in response to an intervention required (IRQ) signal, simultaneously with the main process, the aiding process and the volume compensating process are light in load and hence there is no need to employ a high-speed CPU for the system CPU 10.

Further, although in the above described embodiments, the T-RAM 32 is designed to have a capacity sufficient for storing thirty-two words of sequence data, this is not limitative, but it is only required to have such a capacity as to enable reproduction of a musical composition and much smaller than that of the RAM 11.

Further, the cellular phone 1 according to the above described embodiments can download desired musical composition data from a distribution center by connecting the cellular phone 1 to the distribution center.

The mobile device according to the invention is by no means applied to only a cellular phone as described above, but it may be applied to various kinds of mobile devices, such as personal computers, and other information devices, insofar as they include musical composition-reproducing means.

It goes without saying that the object of the present invention may be accomplished by installing program codes of software realizing the functions of the mobile device of the above described embodiments, from a storage medium in which the program codes are recorded into the mobile device and causing a computer (or CPU) of the mobile device to execute the program.

In this case, the program codes themselves which are installed in the mobile device by using the storage medium achieve the novel functions of the present invention, and the storage medium storing the program codes constitutes the present invention.

The storage medium for recording the program codes may be a floppy disk, a hard disk, an optical memory disk, an magneto-optical disk, a CD-ROM, a CD-R (CD-Recordable), a magnetic tape, a nonvolatile memory card, or a ROM, for instance. Also, the program codes may be supplied from a server computer through a communication network.

It goes without saying that the present invention encompasses a case in which the functions of the illustrated embodiments are accomplished not only by executing the program codes read out by the computer, but also by causing an OS operating on the computer to perform a part or all of actual operations according to the instructions of the program codes.

Further, the present invention also encompasses a case in which the program codes read out from the storage medium are written into a memory provided in an expanded function board inserted in the computer or in an expanded function unit connected to the computer, and then the CPU or the like integrated in the expanded function board or expanded function unit actually performs a part of or all of the operations, based on the instructions of the program codes, so as to accomplish the functions of the illustrated embodiments.

INDUSTRIAL APPLICABILITY

The mobile device according to the present invention is capable of curtailing the battery drain as much as possible by decreasing the number of parts that are reproduced or by assigning musical composition data to musical tone synthesis sections unassigned to parts in addition to musical tone synthesis sections for original parts to thereby cause each part to be reproduced by a plurality of musical tone synthesis sections, thereby enabling compensation for a lowered volume of each part. Therefore, the mobile device according to the present invention can be applied to mobile devices, such as cellular phones, personal computers, and other information devices. which include musical composition-reproducing means.

The invention claimed is:

1. A mobile device comprising:

musical composition-reproducing circuitry that is capable of reproducing a musical composition composed of a plurality of parts;

a power supply that supplies power to said musical composition-reproducing circuitry;

a charge state-monitor circuit that monitors an amount of charge in said power supply; and control circuitry that provides control such that a number of parts of said musical composition reproduced by said musical composition-reproducing circuitry is reduced when the monitored amount of charge in said power supply becomes lower than a predetermined value.

2. A mobile device according to claim 1, wherein said musical composition-reproducing circuitry includes a plurality of musical tone synthesis sections for reproducing the musical composition composed of the plurality of parts, and wherein said control circuitry provides control such that a number of said plurality of musical tone synthesis sections to which data of the musical composition is supplied is reduced when the monitored amount of charge in said power supply becomes lower than the predetermined value.

3. A mobile device according to claim 2, wherein said musical composition-reproducing circuitry includes a temporary storage section that temporarily stores the data of the musical composition, a plurality of switching devices arranged between said temporary storage section and said plurality of musical tone synthesis sections, for connecting and disconnecting between said temporary storage section and said plurality of musical tone synthesis sections, respectively, and wherein when the monitored amount of charge in said power supply becomes lower than the predetermined value, said control circuitry reduces a number of said plurality of switching devices that connect between said temporary storage section and said plurality of musical tone synthesis sections to thereby reduce the number of said plurality of musical tone synthesis sections to which the data of the musical composition is supplied.

4. A mobile device according to claim 2, including a storage section that stores the data of the musical composition, and wherein said musical composition-reproducing circuitry includes a temporary storage section that temporarily stores the data of the musical composition, and reading/writing control circuitry that controls reading and writing the data of the musical composition from and into said temporary storage section, and wherein when the monitored amount of charge in said power supply becomes lower than the predetermined value, said control circuitry controls said reading/writing control circuitry such that a number of parts of the data of the musical composition written into said temporary storage sections is reduced.

5. A mobile device according to claim 2, wherein the data of the musical composition contains a mixture of data of the plurality of parts, and wherein said musical composition-reproducing circuitry includes a temporary storage section that temporarily stores the data of the musical composition, and a sequencer that sequentially reads out the data of the musical composition stored in said temporary storage section into said plurality of musical tone synthesis sections, and wherein when the monitored amount of charge in said power supply becomes lower than the predetermined value, said control circuitry controls said sequencer such that a number of parts of the data of the musical composition read out from said temporary storage section into said plurality of musical tone synthesis sections is reduced.

6. A mobile device according to claim 1, wherein said musical composition-reproducing circuitry includes a single musical tone synthesis section that is capable of reproducing the musical composition composed of the plurality of parts by time-sharing operation, a temporary storage section that temporarily stores the data of the musical composition, a single switching device arranged between said temporary storage section and said single musical tone synthesis section, for connecting and disconnecting between said temporary storage section and said single musical tone synthesis section, and wherein when the monitored amount of charge in said power supply becomes lower than the predetermined value, said control circuitry controls timing of operation of said switching device such that a number of parts of the musical composition supplied to said single musical tone synthesis section is reduced.

7. A mobile device according to claim 1, including a storage section that stores the data of the musical composition, and wherein when the monitored amount of charge in said power supply becomes lower than the predetermined value, said control circuitry provides control such that a number of parts of the musical composition supplied to said musical composition-reproducing circuitry is reduced.

8. A mobile device according to claim 1, wherein said musical composition-reproducing circuitry includes a plurality of musical tone synthesis sections for reproducing the musical composition composed of the plurality of parts, and wherein said control circuitry provides control such that a number of said plurality of musical tone synthesis sections to which the power is supplied from said power supply is reduced when the monitored amount of charge in said power supply becomes lower than the predetermined value.

9. A mobile device according to claim 1, wherein when the monitored amount of charge in said power supply becomes lower than the predetermined value, the control circuitry provides control such that only a melody part is reproduced by said musical composition-reproducing circuitry.

10. A mobile device according to claim 1, wherein said musical composition-reproducing circuitry includes a plurality of musical tone synthesis sections for reproducing the musical composition composed of the plurality of parts, and wherein said control circuitry provides control such that the data of the musical composition is supplied only to one of said plurality of musical tone synthesis sections that reproduces a melody part.

11. A mobile device according to claim 1, wherein said musical composition-reproducing circuitry includes a plurality of musical tone synthesis sections for reproducing the musical composition composed of the plurality of parts, and wherein said control circuitry provides control such that power is supplied from said power supply only to one of said plurality of musical tone synthesis sections that reproduces a melody part.

12. A power saving method for a mobile device having musical composition-reproducing circuitry that is capable of reproducing a musical composition composed of a plurality of parts, and a power supply that supplies power to said musical composition-reproducing means, the power saving method saving power consumed from said power supply, and comprising the steps of:

monitoring an amount of charge in said power supply; and controlling said musical composition-reproducing circuitry in a manner such that the number of parts of the musical composition reproduced by said musical composition-reproducing circuitry is reduced when the monitored amount of charge in said power supply becomes lower than a predetermined value.

13. A storage medium storing a program that can be executed by a computer, the program, which when executed, being capable of realizing a power saving method for a mobile device having musical composition-reproducing circuitry that is capable of reproducing a musical composition composed of a plurality of parts and a power supply that supplies power to said musical composition-reproducing circuitry, the power saving method saving power consumed from said power supply, the method comprising the steps of:

monitoring an amount of charge in said power supply; and controlling said musical composition-reproducing circuitry in a manner such that the number of parts of the musical composition reproduced by said musical composition-reproducing circuitry is reduced when the monitored amount of charge in said power supply becomes lower than a predetermined value.

14. A mobile device comprising:

musical composition-reproducing means for reproducing a musical composition of a plurality of parts;

power supply means for supplying power to said musical composition-reproducing means;

charge state-monitoring means for monitoring an amount of charge in said power supply means; and control means for controlling said musical composition-reproducing means so that a number of parts of said musical composition is reduced when the monitored amount of charge in said power supply means becomes lower than a pre-determined value.

15. A mobile device according to claim 14, wherein said musical composition-reproducing means includes a plurality of musical tone synthesis sections for reproducing the musical composition composed of the plurality of parts, and wherein said control means reduces a number of said plurality of musical tone synthesis sections to which data of the musical composition is supplied.

16. A mobile device according to claim 15, wherein said musical composition-reproducing means includes a temporary storage section for temporarily storing the data of the musical composition, and a plurality of switching means arranged between said temporary storage means and said plurality of musical tone synthesis sections, the plurality of switching means for disconnecting and connecting between said temporary storage section and said plurality of musical tone synthesis sections, respectively, and wherein when the monitored amount of charge in said power supply means becomes lower than a predetermined value, said control means reduces a number of said plurality of switching devices that connect between said temporary storage section and said plurality of musical tone synthesis sections to thereby reduce the number of said plurality of musical tone synthesis sections to which the data of the musical composition is supplied.

17. A mobile device according to claim 15, including a storage means for storing data of the musical composition and wherein said musical composition-reproducing means includes a temporary storage section that temporarily stores the data of the musical composition and reading/writing control means for controlling reading and writing the data of the musical composition from and into said temporary storage section, and wherein when the monitored amount of charge in said power supply means becomes lower than a predetermined value, said control means controls said reading/writing control means to reduce a number of parts of the data of the musical composition written into said temporary storage sections.

18. A mobile device according to claim 15, wherein the data of the musical composition contains a mixture of data of the plurality of parts, and wherein said musical composition-reproducing means includes a temporary storage section that temporarily stores the data of the musical composition, and sequencer means to sequentially read out the data of the musical composition in said temporary storage section into said plurality of musical tone synthesis sections, and wherein when the monitored amount of charge in said power supply means becomes lower than the predetermined value, said control means controls said sequencer means such to reduce a number of parts of the data of the musical of the musical composition read out from said temporary storage section into said plurality of musical tone synthesis sections.

19. A mobile device according to claim 14, wherein said musical composition-reproducing means includes a single musical tone synthesis section that is capable of reproducing the musical composition composed of the plurality of parts by time-sharing operation, a temporary storage section that temporarily stores the data of the musical composition, a single switching means, arranged between said temporary storage section and said single musical tone synthesis section, for connecting and disconnecting between said temporary storage section and said single musical tone synthesis section, and wherein when the monitored amount of charge in said power supply means becomes lower than the predetermined value, said control means controls timing of operation of said switching means to reduce a number of parts of the musical composition supplied to said single musical tone synthesis section.

20. A mobile device according to claim 14, including a storage means for storing the data of the musical composition, and wherein when the monitored amount of charge in said power supply means becomes lower than the predetermined value, said control means reduces a number of parts of the musical composition which is supplied to said musical composition-reproducing means.

* * * * *